United States Patent [19]

Payne

[11] Patent Number: 4,665,292
[45] Date of Patent: May 12, 1987

[54] BOIL POINT PREDICTION ARRANGEMENT FOR COOKING APPLIANCE

[75] Inventor: Thomas R. Payne, Louisville, Ky.

[73] Assignee: General Electric Company, Louisville, Ky.

[21] Appl. No.: 816,620

[22] Filed: Jan. 6, 1986

[51] Int. Cl.⁴ ............................................. H05B 1/02
[52] U.S. Cl. .................................... 219/450; 219/494; 219/449
[58] Field of Search ............... 219/450, 448, 449, 494, 219/452, 453, 451, 445, 446, 447, 459, 489, 492, 518, 516; 236/20 A; 126/374, 39 G

[56] References Cited

U.S. PATENT DOCUMENTS

| | | | |
|---|---|---|---|
| 3,118,044 | 1/1964 | Holtkamp | 219/450 |
| 3,153,139 | 10/1964 | Sivacek | 219/450 |
| 3,384,735 | 5/1968 | Linger | 219/456 |
| 3,819,906 | 6/1974 | Gould, Jr. | 219/506 |
| 4,164,645 | 8/1979 | Dogliotti | 219/452 |
| 4,214,150 | 7/1980 | Cunningham | 219/452 |
| 4,241,289 | 12/1980 | Bowling | 219/450 |
| 4,334,145 | 6/1982 | Norris, Sr. | 219/453 |
| 4,351,996 | 9/1982 | Kondo et al. | 219/10.49 R |
| 4,379,964 | 4/1983 | Kanazawa | 219/492 |
| 4,394,565 | 7/1983 | Dills | 219/452 |
| 4,431,906 | 2/1984 | Oota | 219/492 |
| 4,465,228 | 8/1984 | Mori et al. | 236/20 A |
| 4,492,336 | 1/1985 | Takata et al. | 236/20 A |
| 4,549,527 | 10/1985 | Davis | 126/374 |

FOREIGN PATENT DOCUMENTS 59-56627 4/1984 Japan ................... 219/492

OTHER PUBLICATIONS

Technical Paper—Presented to ASME by A. Myklebust et al—Aug. 1982—"Microcomputer Control of a Residential Range Top for Energy Conservation".

Technical Paper—International Appliance Technical Conf.—May 1983—Terai et al. "Boiling Point Detector for Surface Cooking Unit"—pp. 421–440.

Primary Examiner—E. A. Goldberg
Assistant Examiner—Teresa J. Walberg
Attorney, Agent, or Firm—H. Neil Houser; Radford M. Reams

[57] ABSTRACT

An automatic boil point prediction arrangement for a cooking appliance having an automatic surface unit, in which the surface unit is operated at a predetermined power level at least until the sensed utensil temperature rises to a predetermined threshold temperature. The heat up time required for the sensed utensil temperature to reach the threshold temperature is measured and an estimate of the additional completion time required for the water in the utensil to reach its boil point is established as a function of the heat-up time. A signal is generated upon expiration of this completion time to inform the user that boiling has begun.

6 Claims, 19 Drawing Figures

FIG. 8
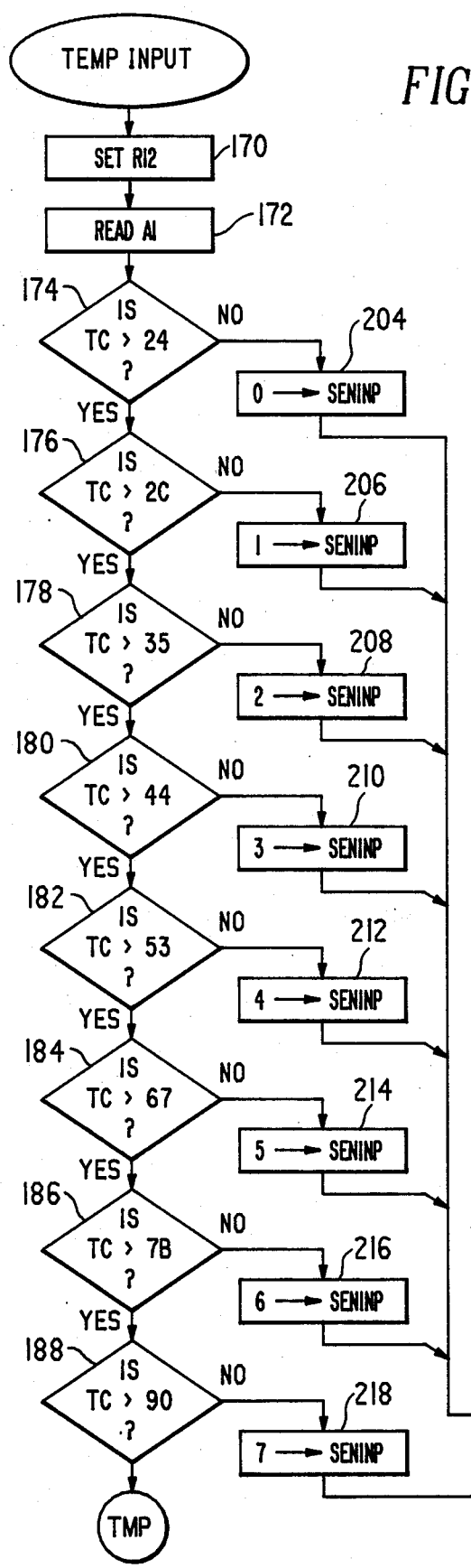
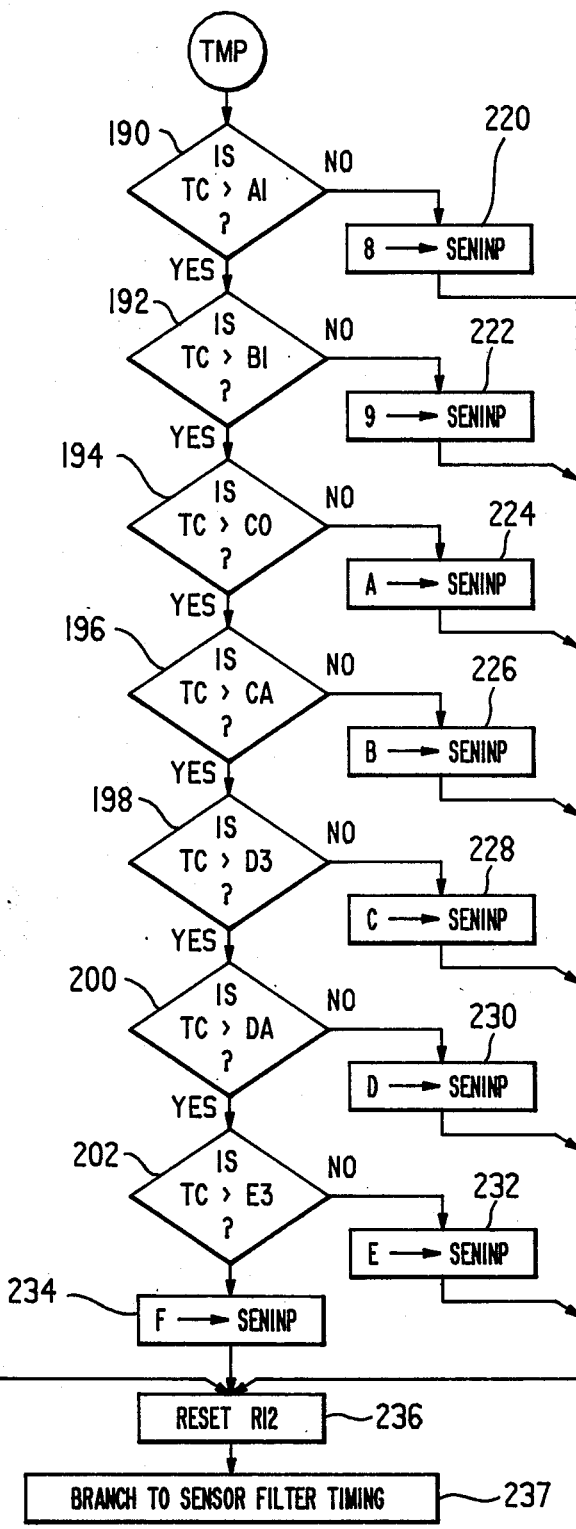

BOIL POINT PREDICTION ARRANGEMENT FOR COOKING APPLIANCE

BACKGROUND OF THE INVENTION

This invention relates generally to electronically controlled cooking appliances such as domestic ranges or cooktops featuring one or more automatic surface units which allow the user to select a Boil Mode to bring liquids contained in a utensil being heated by the automatic surface unit to a boil. More particularly this invention relates to a method and apparatus for predicting when the liquid being heated by the automatic surface unit begins to boil. This information can be used by the control to trigger a signal informing the user that boiling has begun. Also, the information could be used as an input to a variety of power control algorithms which could be used to vary the heating of the utensil for improved efficiency or to prevent boil over. An example of an electronically controlled cooking appliance to which the invention is particularly applicable is disclosed in commonly assigned U.S. Pat. No. 4,493,980 to Payne et al entitled "Power Control Arrangement for Automatic Surface Unit", which is hereby incorporated by reference.

U.S. Pat. No. 4,465,228 to Mori et al discloses one technique for implementing boil point detection in a cooking appliance. In accordance with Mori et al the gradient of the sensed utensil temperature is monitored and compared to a reference value to detect a decrease in gradient signifying that the water contained in the utensil has reached its boiling point. This gradient approach is based on the fact that the temperature of the water being heated in the utensil will not significantly exceed 100° C. and consequently the sensed utensil temperature generally rises, if at all, at a much slower rate after boiling than prior to boiling. Upon detection of boiling, the heating level of the heater means is decreased to a level just sufficient to maintain boiling. Recognizing that the temperature gradient may vary greatly depending upon the size of the load being heated, and that for large loads the change in gradient may be difficult to detect and that for small loads, boil point detection may be late, the sampling times are varied as a function of the change in temperature since the next preceeding sample.

While generally speaking, the sensed temperature rises more slowly once the water in the utensil begins to boil, empirical observations have shown that for small water loads (less than 2 cups of water) the temperature sensed by the sensor may continue to increase for a significant period of time with little decrease in rate after the water has begun to boil. Similar results occur when utensils with warped or bowed bottom walls are employed. Under such operating conditions the gradient technique can be unreliable.

Another shortcoming of the gradient approach is its inability to detect the boil point if the water load is changed during the heat-up phase. It is not uncommon for the user to decide to add water to the utensil during the heat-up phase. The immediate affect of the addition of water is to lower the temperature of the load in the utensil and hence the temperature sensed by the sensor. If water is added early in the heat-up phase, the system may set up the wrong gradient for comparison purposes. If water is added relatively late in the heat-up phase, the resulting change in gradient may be incorrectly interpreted by the controller as the onset of boiling. Because the addition of water during the heat-up phase is a fairly common occurrence, it would be desirable to have a boil point detection arrangement which can reliably determine when boiling begins under such changing conditions.

It is therefore an object of the present invention to provide a relatively simple method and apparatus for reliably predicting when the boil point of water contained in a utensil being heated by an electronically controlled cooking appliance featuring an automatic surface unit will be reached regardless of the size of the water load.

It is a further object of the invention to provide a boil point prediction method and apparatus of the aforementioned type, the reliability of which is not affected by use of utensils in which the bottom wall is flat or bowed.

It is a further object of the invention to provide a boil point prediction method and apparatus of the aforementioned type, the reliability of which is not adversely affected by the addition of water during the heat-up phase.

SUMMARY OF THE INVENTION

In accordance with the present invention there is provided a boil point prediction apparatus and method for a cooking appliance of the type having at least one automatic surface unit for heating water contained in a utensil placed thereon. The apparatus includes temperature sensing means for sensing the temperature of the utensil placed on the surface unit, user operable input selector means enabling the user to select a boil mode, electronic control means responsive to the temperature sensing means and the input selector means for controlling the power level of the surface unit and operative in response to selection of the boil mode to operate the surface unit at a predetermined power level at least until the sensed utensil temperature rises to a predetermined threshold temperature. The control means includes timing means for measuring the heat up time required for the sensed utensil temperature to reach the predetermined threshold temperature following section of the boil mode. This heat-up time provides a direct analog of the thermal size of the load being heated. The control means further includes means for establishing a completion time as a function of the heat-up time. The completion time represents the approximate additional time required for the water in the utensil to reach its boil point.

In the illustrative embodiment of the invention, the surface unit is operated at a predetermined power level until the sensed utensil temperature reaches the threshold temperature and thereafter the heating unit is operated at a steady state power level corresponding to the steady state heat setting selected by the user from a plurality of available steady state heating levels. In accordance with this aspect of the invention the control means is arranged to establish completion time as a function of both the heat-up time and the selected steady state heating level. When the completion time expires signifying that the liquid should have reached its boil point a user discernible signal is generated such as by an annunciator, to inform the user that boiling has begun.

While the novel features of the invention are set forth with particularly in the appended claims, the invention, both as to organization and content will be better understood and appreciated from the following detailed description taken in conjunction with the drawings.

BRIEF DESCRIPTION OF THE DRAWINGS

FIG. 8 is a flow diagrams of the TEMP INPUT routine incorporated in the control program for the microprocessor in the circuit of FIG. 6;

DETAILED DESCRIPTION OF THE ILLUSTRATIVE EMBODIMENT

Figure 1:
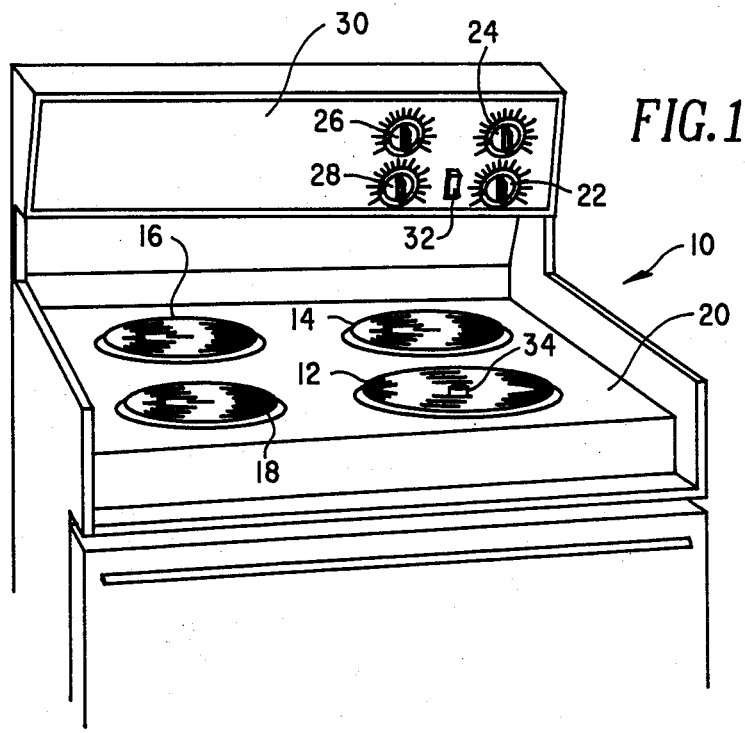
FIG. 1 is a front perspective view of a portion of an electric range illustratively embodying the power control arrangement of the present invention.

FIG. 1 illustrates an electric range 10 incorporating a control arrangement illustratively embodying the present invention. Range 10 includes four conventional electric surface units comprising resistive heating elements 12, 14, 16 and 18 supported from a substantially horizontal support surface 20. Each of elements 12-18 are adapted to support cooking utensils, such as frying pans, sauce pans, tea kettles, etc., placed thereon for heating. Manually operable rotary control knobs 22, 24, 26 and 28 are mounted to control panel 30. Control knobs 24, 26 and 28 enable the user to select the desired power level for heating elements 14, 16 and 18, respectively in a conventional manner. Heating element 12 is arranged to function as an automatic surface unit, that is, energization of element 12 is automatically controlled as a function of the temperature of the utensil being heated thereon. It is common practice to provide only one automatic surface unit in a multiple unit range or cooktop. However, multiple automatic surface units could be provided.

Figure 2:
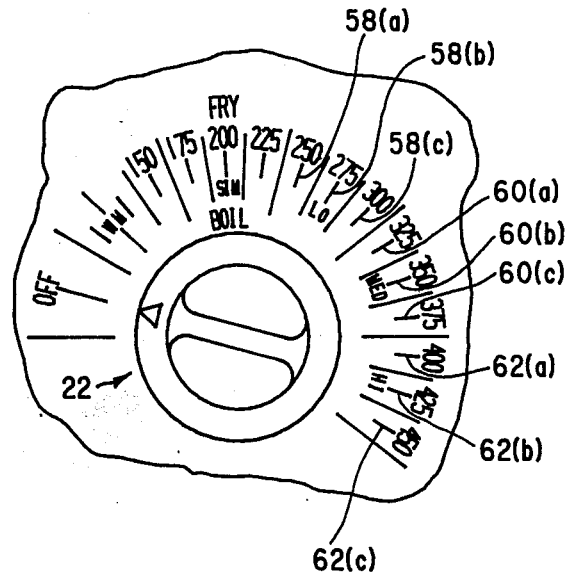
FIG. 2 is a greatly enlarged view of a portion of the control panel of the range of FIG. 1 showing the details of one of the control knobs thereof.

The sensed utensil temperature sensed by temperature sensing device 34, hereinafter referred to as the sensed utensil temperature, is used in implementing a plurality of operating modes for element 12 including a Fry Mode and a general Boil Mode. The general Boil Mode comprises several actual Boil Modes, a Warm Mode and a Simmer Mode. Mode selection switch 32 on control panel 30 enables the user to select the Fry Mode or the general Boil Mode for heating element 12. As best seen in FIG. 2, control knob 22 enables the user to select a plurality of heat settings corresponding to various cooking temperatures for the Fry Mode. For the general Boil Mode the user may select Warm, Simmer and the actual Lo, Med and Hi Boil Modes, and may select from a plurality of heat settings within each of these modes as well.

Figure 3B:
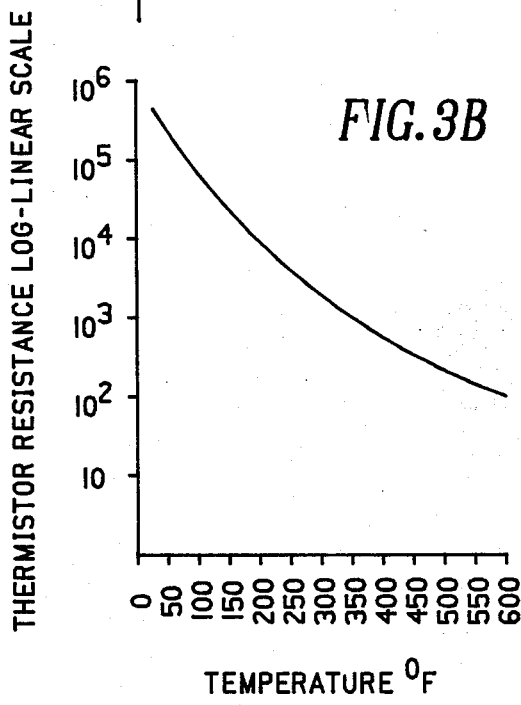
FIG. 3B is a graphic representation of the resistance versus temperature characteristic for the temperature sensor of FIG. 3A.
Figure 3A:
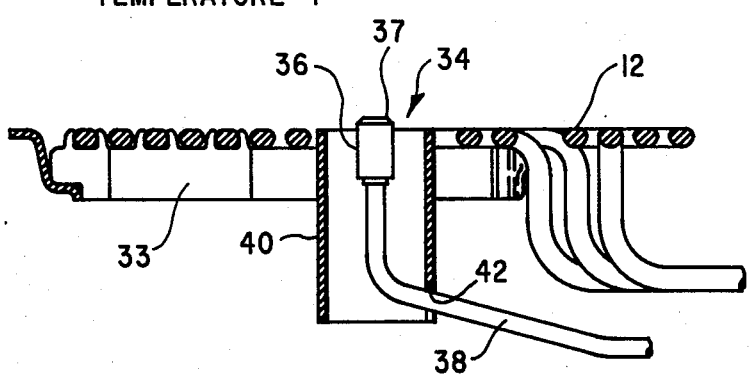
FIG. 3A is a sectional side view of a surface unit of the type incorporated in the range of FIG. 1 showing the temperature sensor.

The utensil temperature sensing arrangement employed in the illustrative embodiment will now be described with reference to FIG. 3A. Surface unit heating element 12 is supported on spider arms 33. The temperature sensor apparatus designated generally 34 includes a housing 36 mounted on one end of an elongated, generally L-shaped tubular arm 38.

A cylindrical shield 40 of low thermal mass metal forms the central core to which the radial spider arms 33 are attached and also serves to shield sensor housing 36 from radiated heat from heating element 12. Arm 38 extends through a slot 42 in shield 40, and bears against the upper end of the slot to hold housing 36 in the proper position slightly above the element 12 so as to cause the uppermost surface 37 of housing 36 to resiliently contact the bottom of a cooking utensil when it is placed on heating element 12. The temperature sensitive element (not shown) of the sensor contained within housing 36 is a conventional negative temperature coefficient thermistor having a resistance vs. temperature characteristic as shown in FIG. 3B. The structural details of this sensor arrangement do not form any part of the subject invention and are thus described only to the extent necessary for an understanding of the present invention. Such devices are described in greater detail in commonly assigned U.S. Pat. No. 4,241,289, the disclosure of which is hereby incorporated by reference.

Figure 4:
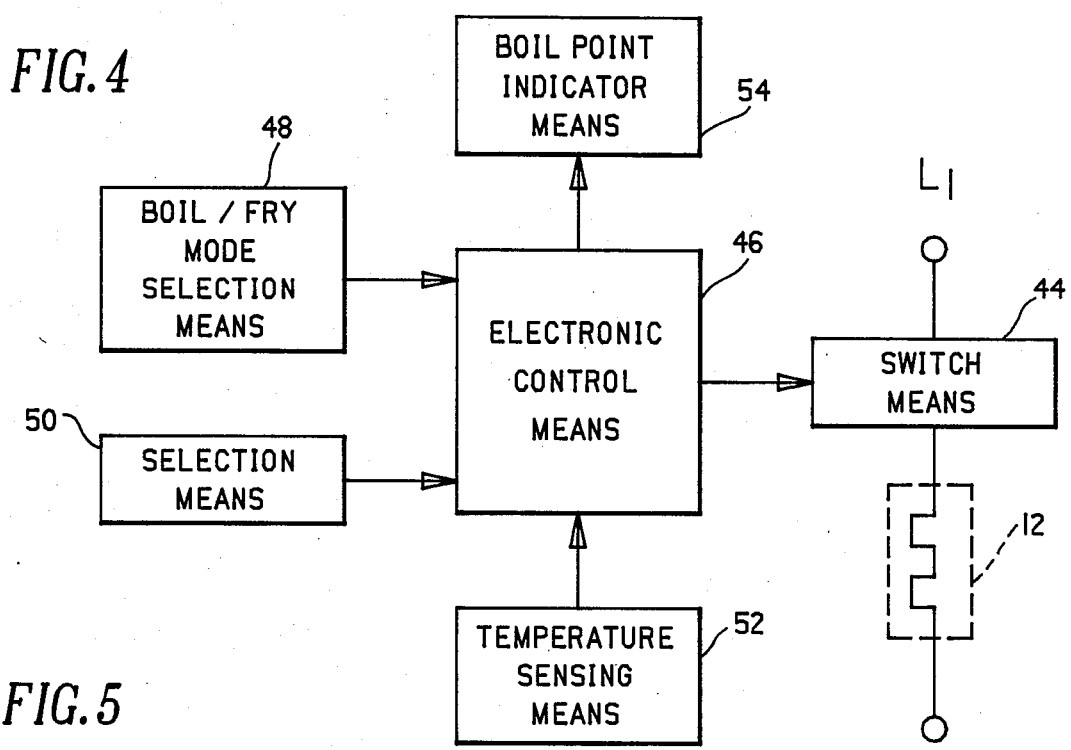
FIG. 4 is a greatly simplified functional block diagram of the control arrangement employed in the range of FIG. 1 embodying the boil point detection arrangement of the present invention.

A generalized functional block diagram of the power control arrangement for heating element 12 of range 10 is shown in FIG. 4 wherein heating element 12 is energized by a standard 60 Hz AC power signal which can be either 120 or 240 volts supplied to terminals L1 and L2. Power to element 12 is controlled by switch means 44 connected in series with element 12. Switch means 44 is switched into and out of conduction by control signals generated by electronic control means 46.

Electronic control means 46 generates power control signals in response to inputs from the user operable input selection means comprising Boil/Fry Mode selection means 48 and heat setting section means 50, and inputs from temperature sensing means 52 which senses the temperature of the utensil being heated by element 12. The output of Boil/Fry Mode selection means 48 represents the state of mode selection switch 32 (FIG. 1) indicating to control means 46 whether the general Boil or Fry Mode has been selected. The output of heat setting selector means 50 represents the heat setting selected by the user by manipulation of control knob 22 (FIGS. 1, 2).

In the illustrative embodiment, electronic control means 46 controls the power level applied to heating element 12 by controlling the duty cycle of heating element 12, i.e., the percentage of time power is applied to heating element 12. A predetermined control period comprising a fixed number of control intervals is employed as the time base for power control. The ratio of conductive control intervals to the total number of control intervals in the control period, expressed as a percentage, is hereinafter referred to as the duty cycle. Preferably each control interval comprises eight full cycles of the standard 60 Hz 240 volt AC power signal corresponding to a time period of approximately 133 milliseconds. Each control period comprises 32 control intervals corresponding to a time period of approximately 4 seconds. The duration for the control interval and control period selected provide a satisfactory range of heat settings for desired cooking performance and can be programmed to make efficient use of microprocessor memory. It is understood, however, that control intervals and control periods of greater and lesser duration could be similarly employed. Electronic control means 46 selectively implements one of sixteen different duty cycle power levels, including a zero duty cycle or OFF level. Table I shows the percentage ON time, i.e. the duty cycle and the number of conductive control intervals per control period for each of sixteen available power levels.

TABLE I

| Power Level | % On Time | On Control Intervals Per Control Period | Hex Rep M(KB) |
|---|---|---|---|
| OFF | 0 | 0 | 0 |
| 1 | 3 | 1 | 1 |
| 2 | 6.5 | 2 | 2 |
| 3 | 9 | 3 | 3 |
| 4 | 12.5 | 4 | 4 |
| 5 | 16 | 5 | 5 |
| 6 | 22 | 7 | 6 |
| 7 | 25 | 8 | 7 |
| 8 | 31.5 | 10 | 8 |
| 9 | 37.5 | 12 | 9 |
| 10 | 44 | 14 | A |
| 11 | 50 | 16 | B |
| 12 | 62.5 | 20 | C |
| 13 | 75 | 24 | D |
| 14 | 87.5 | 28 | E |
| 15 | 100 | 32 | F |

The General Boil Mode or the Fry Mode is selected via mode switch 32. Within the General Boil Mode, the user is further able to select the Warm, Simmer and actual Boil Modes, the latter being further divided into Lo, Med and Hi modes. The Warm and Simmer modes are not intended to bring liquids to boiling. Consequently, the boil prediction scheme of the present invention is only utilized in the actual boil mode.

Details of the aforementioned Fry mode as well as the Warm and Simmer modes are not believed necessary to an understanding of the present invention. Hence, the balance of the description to follow is directed to the actual Boil Modes. Illustrative Fry, Warm and Simmer modes are described in detail in the aforementioned U.S. Pat. No. 4,493,980.

TABLE II

| Hexadecimal Representation of Setting (KB) | Boil Mode | | |
|---|---|---|---|
| | Selected Heat Setting | Steady State Utensil Temp. Range °F. | Steady State Power Level M(KB) |
| 7 | Lo(1) | 216– | 8 |
| 8 | Lo(2) | 216– | 9 |
| 9 | Lo(3) | 216– | A |
| A | Med(1) | 216– | B |
| B | Med(2) | 216– | B |
| C | Med(3) | 216– | C |
| D | Hi(1) | 216– | D |
| E | Hi(2) | 216– | E |
| F | Hi(3) | 216– | E |

The three actual boil modes, that is the three modes for controlling the actual boiling of water loads contained in utensils placed on heating element 12, are designated Lo, Med, and Hi Modes. Each of these modes has three heat settings corresponding to selection marks 58(*a*)–(*c*), 60(*a*)–(*c*) and 62(*a*)–(*c*) for Lo, Med and Hi Boil Modes, respectively for control knob 22 (FIG. 2); hence, in the illustrative embodiment the user can select from a total of 9 heat settings for boiling water loads on heating element 12. The steady state power level for each heat setting is shown in Table II.

These nine heat settings enable the user to select the steady state power level or duty cycle which will achieve the desired boiling rate for various size water loads without employing a power level substantially higher than necessary thereby enhancing the energy efficiency of the appliance.

As described in greater detail in the aforementioned U.S. Pat. No. 4,493,980 patent, the Boil mode provides a rapid thermal response as well as efficient steady state operation by operating the heating element at full power until the sensed utensil temperature exceeds a predetermined reference temperature and thereafter operating the heating element at a steady state power level associated with the user selected heat setting.

It will be recalled that an object of the invention is to predict when a water load being heated by the automatic surface unit will first begin to boil.

In accordance with one aspect of the present invention the heat-up time, that is, the time required for the sensed utensil temperature to reach the threshold temperature is measured and used as a basis for predicting when the boil point will be reached. To this end, the surface unit is operated at a predetermined power level at least until the reference temperature is reached, and the measured heat-up time serves as a direct analog of the thermal size of the load. Completion time, that is, the time required to bring water loads of various thermal load size from the threshold temperature to the boiling point is established by the electronic control as a function of measured heat-up time. In a preferred form of the invention heat-up times for various sizes of water loads are empirically determined and stored in the controller memory to enable the electronic control to establish the completion time as a function of the measured heat-up time.

In choosing a threshold reference temperature for this arrangement, a temperature close to the boiling point is desirable since such a section results in a longer heat-up time permitting a more reliable load size determination as well as a shorter completion time which also contributes to accuracy of response. However, the threshold temperature must not be so close that boiling could occur before reaching the threshold temperature because the sensed temperature of the water and hence the sensed utensil temperature may not increase appreciably once the water load begins boiling. If boiling begins before the threshold temperature is reached, the threshold temperature may not be exceeded in which case the completion time could not be established and the boil point would not be detected. The section criteria for the boil detection threshold temperature and the Boil mode reference temperature as described in the U.S. Pat. No. 4,493,980 patent are quite similar. Thus, though not necessary, it is particularly convenient in the illustrative embodiment to use the same temperature for both purposes. A threshold temperature of 215°–220° F. in combination with a predetermined power level of full or 100% duty cycle has been shown to provide satisfactory results for both boil mode operation and boil point detection. It will be appreciated, however, that different parameters could be similarly used.

The control system is arranged to recognize that the water has reached its boiling point when the completion time has elapsed. This information is used in the illustrative embodiment to provide a user discernible signal in the form of an audible tone when the completion time has elapsed, to signify that boiling has begun. This information could also be used in power control algorithms to vary the heat level of the surface unit such as in the aforementioned Mori et al patent, and variations thereof.

For purposes of illustration, the completion time data utilized in the illustrative embodiment is for three load sizes and for three power levels. The data is illustrated graphically in FIG. 5 which shows the completion times as a function of surface unit power level for three water load sizes, 2 liters, 1 liter, and 0.5 liter. The heat-up times, that is the time required to raise the actual water temperature from room temperature to 190° F. for these loads, were empirically determined to be 365, 220 and 144 seconds respectively, using a standard General Electric WB 30 X 218 surface unit operating at full power (240 volts, 100% duty cycle). The actual water temperature was measured directly by a sensor immersed in the water. An actual water temperature of 190° F. corresponds roughly to a sensed utensil temperature that is the temperature sensed at the outside bottom wall of the utensil on the order of 215°–220° F. for typical utensils.

Figure 5:
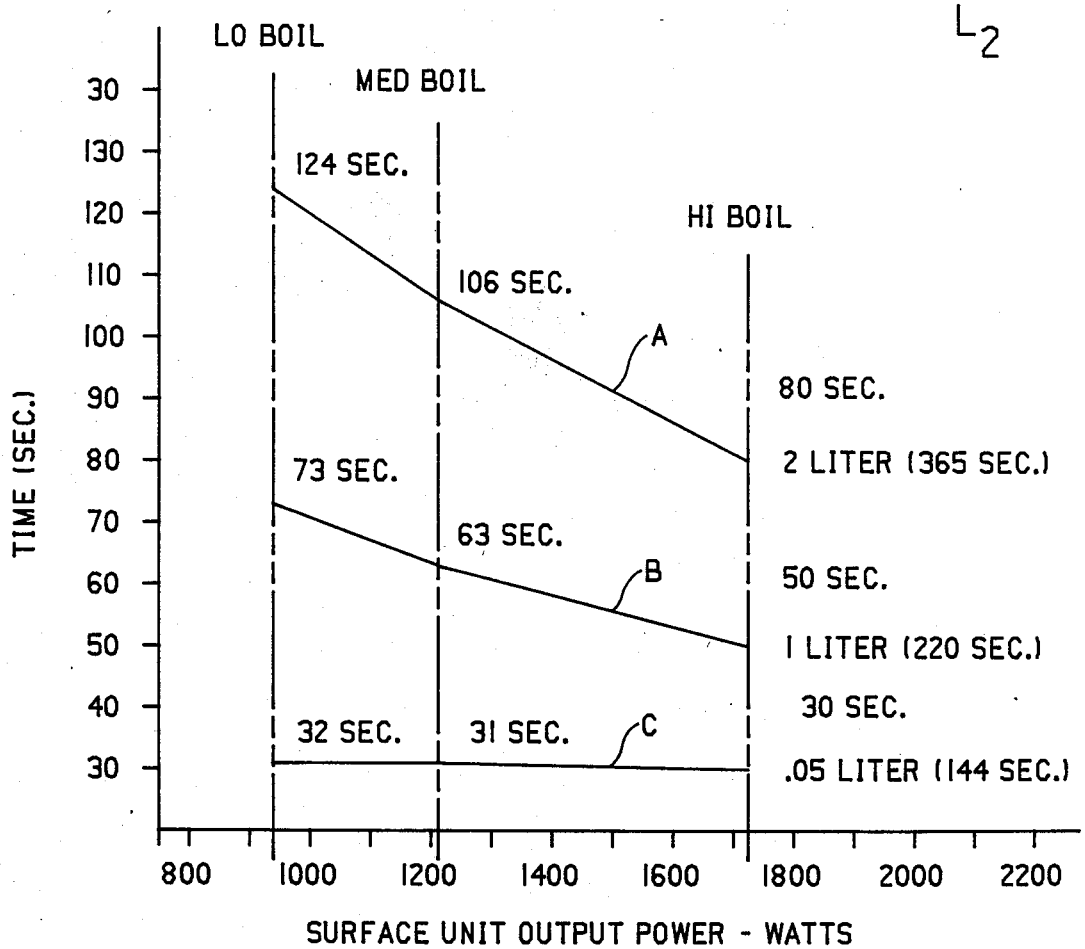
FIG. 5 graphically represents the time required for the temperature of water in a utensil being heated by a surface unit to increase from a predetermined threshold sensed utensil temperature to the boiling point as a function of the output power of the surface unit, for various quantities of water.

The vertical dashed lines in FIG. 5 correspond to the steady state power levels for the nominal or mid-range power settings for Lo, Med, and Hi Boil selections. For example, when the user selects the setting illustrated at 62(b) (FIG. 2), corresponding to Hi (2) (Table II) the heating unit is operated at an output power of approximately 1620 watts (87.5% duty cycle). Similarly, when Med (2) is selected the output power is approximately 1100 watts (50% duty cycle) and for Lo (2) the output power is about 840 watts (37.5% duty cycle). Curve A represents the time required to heat 2 liters of water from 190° F. to boiling as a function of the power level at which the surface unit is operating. The completion time for a 2 liter load for the Hi (2), Med (2) and Lo (2) settings is 80, 106 and 124 seconds respectively. Curves B and C represent similar information for the 1 liter and 0.5 liter loads respectively.

In the illustrative embodiment, water loads are grouped by thermal load size into three categories, small, medium and large. Small loads are characterized by heat-up times less than 182 seconds; medium loads by heat-up times greater than 182 but less than 292 seconds; and large loads by heat-up times greater than 292 seconds. The completion times chosen for the large and medium load size categories are the times measured for the 2.0 liter, 1.0 liter reference loads, respectively, resulting in three completion times for each category corresponding to the three nominal power settings. For the small load size the variation in completion time for the different power settings are so small that a single nominal completion time is utilized for the small load category for all power settings.

The load size break points or thresholds of 182 seconds between small and medium and 292 between medium and large, are somewhat arbitrarily selected as approximately half the difference between the heat-up times for the reference 2 liter and 1 liter, and 1 liter and 0.5 liter load sizes respectively.

The use of three load size categories and completion times for only the nominal power setting are simplifying approximations which have been found to provide satisfactory results. However, it will be appreciated that system accuracy can be enhanced by increasing the number of load size categories and also by providing corresponding completion times for the additional power settings.

It will be apparent that the initial water temperature, typically the tap water temperature, could vary as much as from approximately 50°–60° F. in winter to approximately 70°–80° F. in summer. The maximum error for a given water load size is roughly the time required to heat that load from the minimum extreme of 50°–60° F. to the maximum extreme of 70°–80° F. This time is a relatively small percentage of the total time required to raise the sensed utensil temperature to the threshold temperature. Consequently, the effect of initial tap water temperature variations on completion time determination is within acceptable limits.

In the illustrative embodiment the heat-up time is measured starting when the boil mode is selected to provide the longest measurement period, resulting in the most accurate load size estimate under most conditions. It will be appreciated, however, that error resulting from initial temperature variations could be substantially eliminated by initiating the heat-up time measurement when the sensed temperature first reaches a predetermined relatively low reference starting temperature, for example 115° F. Of course, the empirical data used to establish the completion times would need to be derived accordingly.

A significant advantage of the present invention is that the system is not adversely affected by the addition of relatively cold water during the heat-up phase. The time required to reach the threshold temperature will be the analog of the actual thermal load even if cold water is added during the heat-up phase. The addition of water merely increases the heat-up time in direct proportion to the increase in thermal load. This is true even if the threshold temperature has already been exceeded. In such event, the time required for the sensed utensil temperature to return to the threshold temperature is added to the initially determined heat-up time and the completion time is recomputed as a function of the resultant total heat-up time.

The heater means of the illustrative embodiment utilizes a resistance heating element as the heat source. The parameters for load size and completion time determination utilized in the illustrative embodiment have been found to provide satisfactory performance for the particular heating element employed. It will be appreciated, however, that the boil point detection arrangement could be readily adapted for use with other types of heater means including gas units, induction units, or infrared heating units as well. Of course, the load size and time parameters will vary depending upon the characteristics of the heater means, and should be empirically determined for the particular heater means employed. Hence, the parameters herein disclosed are for purposes of illustration are not to be interpreted as limiting the scope of the claimed invention.

Circuit Description

Figure 6:
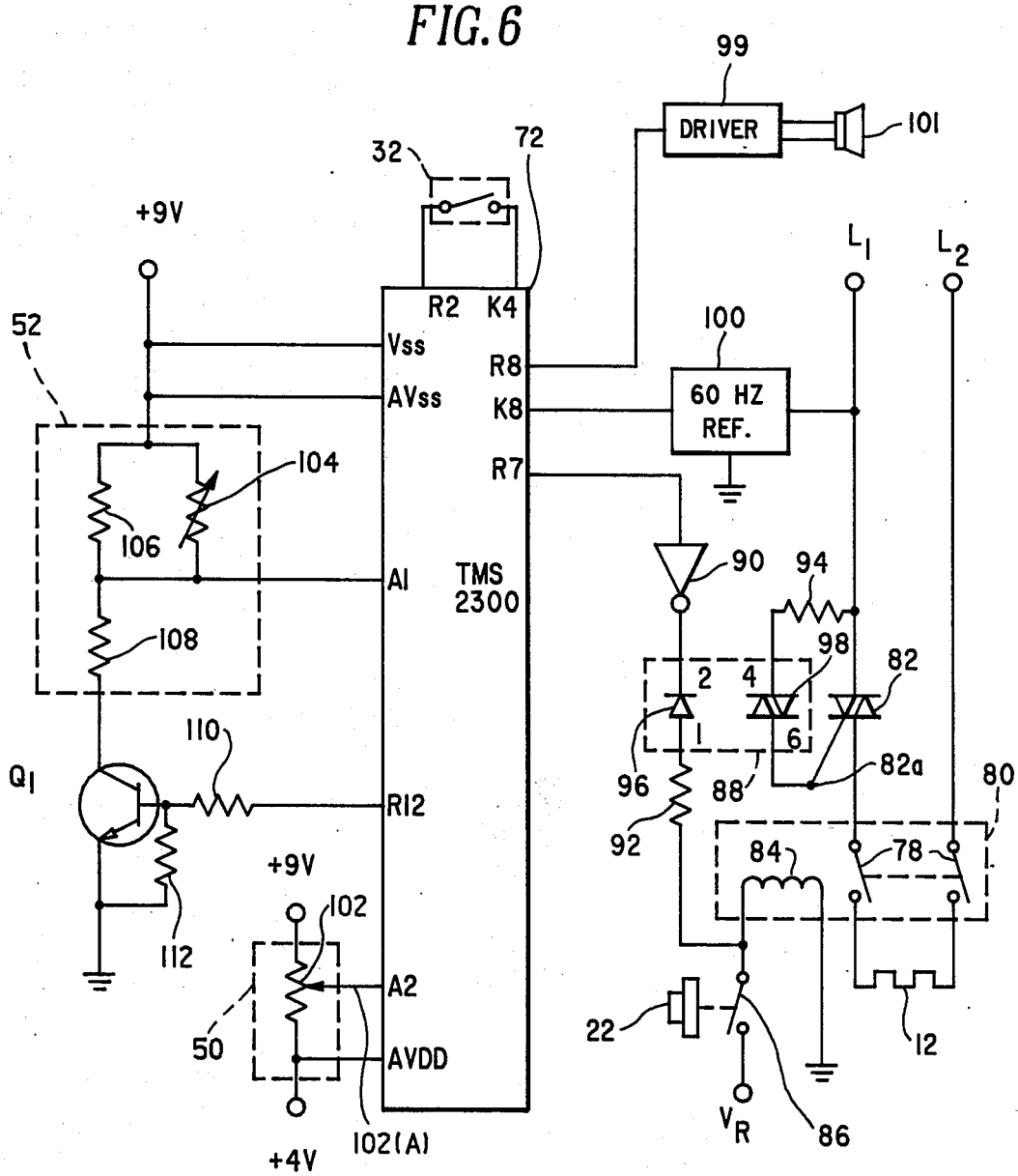
FIG. 6 is a simplified schematic diagram of a control circuit illustratively embodying the power control arrangement of the present invention as embodied in the range of FIG. 1.

A control circuit illustratively embodying a control arrangement implementing the hereinbefore described operating modes in accordance with the present invention is represented in simplified schematic form in FIG. 6. Electronic control means 46 of FIG. 4 is provided in the form of a microprocessor 72. Microprocessor 72 makes power control decisions for heating element 12 in response to input signals from input selection means comprising mode selection switch 32 and heat setting input means 50, and from temperature sensing means 52 in accordance with the control program stored in the Read Only Memory (ROM) of microprocessor to be hereinafter described.

Heating element 12 is connected across power lines L1 and L2 via normally open contacts 78 of ON/OFF relay 80 and power control triac 82. Power lines L1 and L2 are adapted for coupling to an external 60 Hz AC 120 or 240 volt typical domestic power supply. Coil 84 of ON/OFF relay 80 is serially connected between DC reference voltage supply $V_R$ and system ground via ON/OFF switch 86. Switch 86 is mechanically coupled in conventional manner schematically illustrated in phantom to control knob 22 (FIG. 2) such that switch 86 is in its open position when control knob 22 is in its OFF position. Movement of control knob 22 from its OFF position places switch 86 in its closed position energizing coil 84 which in turn closes contacts 78, thereby enabling power control triac 82 to control energization of element 12.

Microprocessor 72 controls the switching of power control triac 82 by trigger signals provided at output port R7. The signal at R7 is coupled to pin 2 of opto-isolator device 88 via inverting buffer amplifier 90. Pin 1 of opto-isolator 88 is coupled to dc reference voltage supply via current limiting resistor 92. The output return pin 4 of opto-isolator 88 is coupled to power line L2 via current limiting resistor 94. Pin 6 is coupled to the gate terminal 82a of power control triac 82 which is connected in series with heating element 12. A trigger signal at R7 is inverted by amplifier 90, thereby forward biasing light emitting diode 96 of opto-isolator 88, which in turn switches the bipolar switch portion 98 of opto-isolator 88 into conduction, thereby applying a gate signal to power control triac 82 to switch it into conduction.

Output port R8 of microprocessor 72 is coupled by conventional driver circuitry 99 to a conventional annunciator or tone generating device 101. Annunciator 101 provides an audible signal to the user when triggered by a trigger signal at port R8.

A 60 Hz pulse train is generated by conventional zero crossing detector circuit 100 coupled between L1 and input port K8 of microprocessor 72 to facilitate synchronization of triac triggering and other control system operations with zero crossings of the 60 Hz AC power signal applied across L1 and L2.

Utensil temperature inputs are provided to microprocessor 72 via temperature sensing means 52 comprising a thermistor device 104 connected in parallel with linearizing resistor 106 and in series with resistor 108 forming a voltage divider network energized by a +9 volt dc voltage supply. The divider network is coupled to ground through transistor Q1. The junction of thermistor 104 and resistor 108 is coupled to input port A1. The analog voltage at this point is proportional to the temperature sensed by the thermistor. Microprocessor 72 has an internal 8-bit A/D converter which operates between voltage rails AVSS and AVDD which are set at 9 volts DC and 4 volts DC respectively, to provide a 5 volt voltage swing. The internal A/D converter measures the input voltage signal at A1 and converts this signal to a corresponding digital value. Table III lists representative values of the thermistor resistance, and corresponding temperature and analog voltage values. Also shown in Table III is the Hexadecimal representation of the corresponding 8 bit binary code resulting from the A/D conversion for the analog voltage values.

Transistor Q together with biasing resistors 110 and 112 functions as a disabling circuit. Output port 2 is coupled to the base of Q1 via resistor 110. Resistor 112 is connected between the emitter and the base of transistor Q1. The function of the disabling circuit is to only allow current flow through thermistor 104 when temperature measurements are being made. To this end, microprocessor 72 sets output R12 causing a positive voltage to be applied to the base of Q1 via resistor 110 switching Q1 into conduction. After the temperature input is obtained, R12 is reset rendering Q1 and thus thermistor 104 non-conductive.

TABLE III

| Temperature °F. | Resistance (Ω) | Analog Volts | Hex Rep |
|---|---|---|---|
| 115 | 22,000 | 4.71 | 24 |
| 140 | 11,500 | 4.86 | 2C |
| 165 | 7,600 | 5.04 | 35 |
| 190 | 5,000 | 5.33 | 44 |
| 215 | 3,300 | 5.63 | 53 |
| 240 | 2,100 | 6.02 | 67 |
| 265 | 1,500 | 6.41 | 7B |
| 290 | 1,050 | 6.82 | 90 |
| 315 | 740 | 7.16 | A1 |
| 340 | 560 | 7.47 | B1 |
| 365 | 410 | 7.77 | C0 |
| 390 | 320 | 7.96 | CA |
| 415 | 250 | 8.14 | D3 |
| 440 | 200 | 8.27 | DA |
| 465 | 150 | 8.45 | E3 |

User inputs are provided to microprocessor 72 via Boil/Fry Mode selection switch means 32 and heat setting selection means 50 comprising input potentiometer 102. Mode selection switch 32 is directly coupled between output port R2 and input port K4 of microprocessor 72. The open and closed states of switch 32 signify selection of the general Boil Mode and Fry Mode, respectively. Microprocessor 72 determines the state of switch 32 by periodically generating a logical high signal at R2 and monitoring the input signal at K4.

Input potentiometer 102 is coupled between the regulated 9 volt dc and 4 volt dc reference voltage supplies. Wiper arm 102a of potentiometer 102 is coupled directly to A/D input port A2 of microprocessor 72. The wiper arm is positioned by user rotation of control knob 22 (FIG. 2). The voltage between wiper arm 102a and the 4 volt supply is an analog signal representing the selected heat setting. The internal A/D converter of microprocessor 72 described briefly above for processing the temperature inputs also processes the user input setting.

The processing of the resultant digitized temperature and power setting input signals will be described in conjunction with the description of the control program and more specifically the User Input and Temp Input routines for the control program.

The following component values are believed suitable for use in the circuit of FIG. 6. These values are illustrative only, and are not intended to limit the scope of the claimed invention.

| Fixed Resistors (Ω) | | | Transistor Q1 |
|---|---|---|---|
| 92 | 220 | | 2H2222 |
| 94 | 220 | | Opto-Isolator |
| 106 | 2.21K | 1% Precision | 88 MDC 3020 Integrated Circuit |
| 108 | 2.21K | 1% Precision | Operational Amplifier |
| 110 | 22K | | 90 ULN 2004A Integrated Circuit |
| 112 | 27K | | |
| Variable Resistor (Ω) | | | Microprocessor |
| 102 | 50K | | 72 Texas Instruments TMS 2300 |
| Thermistor (Ω) | | | Triac |
| 104 | 50K | | 82 General Electric SC 147 |
| | | | Surface Unit |
| | | | 12 General Electric WB 30 × 218 |

Control Program Description

Microprocessor 72 is customized to perform control functions in accordance with this invention by permanently configuring the Read Only Memory (ROM) of microprocessor 72 to implement predetermined control instructions. FIGS. 7 through 14 are flow diagrams which illustrate the control routines incorporated in the control program of microprocessor 72 to perform the control functions in accordance with the present invention. From these diagrams one of ordinary skill in the programming art can prepare a set of instructions for permanent storage in the ROM of microprocessor 72. For the sake of simplicity and brevity, the control routines to follow will be described with respect to the implementation of the control algorithms of the present invention. It should be understood that in addition to the control functions of the present control arrangement herein described there may be other control functions to be performed in conjunction with other operating characteristics of the appliance and in the control of the other three heating elements. Instructions for carrying out the routines described in the diagrams may be interleaved with instructions and routines for other control functions which are not part of the present invention.

The control program consists of a sequence of routines illustrated in the flow diagrams. The control program is cycled through once each control interval, i.e. once each 133 milliseconds. It should be noted that the control circuit is continually energized while the appliance is plugged in so that the control program for heating element 12 is cycled through every 133 milliseconds even if the OFF setting is selected. Hence, a power control decision for heating element 12 is made every 133 milliseconds.

The control program for controlling energization of heating element 12 is logically separated into several control routines. The User Input routine scans mode select switch 32, reads in and converts the analog voltage signal from input potentiometer 102 to determine the user selected mode and heat settings. The Temp Input routine reads in the analog voltage signal representing the sensed utensil temperature and establishes an appropriate digital value corresponding to the sensed utensil temperature range. The Sensor Filter and Timing routine performs a software filter function resulting in an output signal which is the filtered utensil temperature signal. This routine also controls periodic sampling of the filtered signal to minimize radiation effects on its accuracy. This filtered signal is employed in the Boil routine when operating in the Boil Mode to determine the heat level to be implemented as a function of the selected heat setting and the sensed utensil temperature. The appropriate heat level is input to the Power Compare routine which makes the power control decision and the Power Out routine then triggers power control triac 82 into conduction as appropriate thereby implementing the corresponding duty cycle for the desired heat level. The filtered temperature signal is also used in the Boil Point routine which monitors the heat-up time and establishes the completion time for boil point detection. The Boil Signal routine triggers an annunciator upon expiration of the completion time to inform the user that boiling has begun. Each of the control program routines will be described in greater detail with reference to its flow diagram in the discussion to follow.

Figure 7:
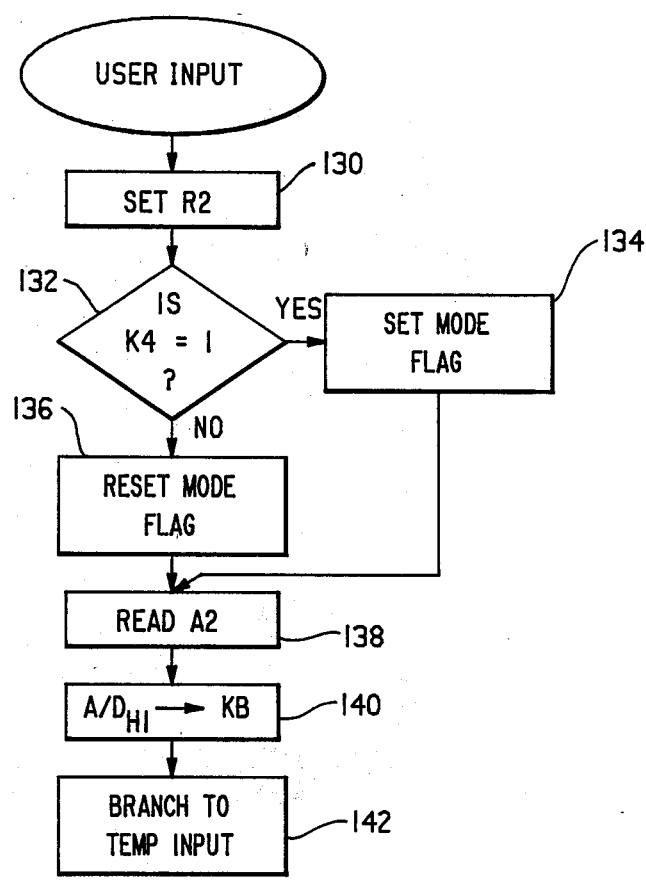
FIG. 7 is a flow diagram of the USER INPUT routine incorporated in the control program for the microprocessor in the circuit of FIG. 6.

USER INPUT Routine—FIG. 7

The function of this routine is to identify the mode selected by the user via mode select switch 32 and the heating setting selected by the user via control knob 22. First, the state of mode select switch 32 is determined by setting output R2 (Block 130). Inquiry 132 then scans input port K4 to determine whether switch 32 is open (K4=0) or closed (K4=1). If K4=1, signifying selection of the Fry Mode, a Mode Flag is set for future reference in a subsequent routine (Block 134). If K4=0, signifying selection of the Boil Mode, the Mode Flag is reset (Block 136).

Following determination of the selected mode, the analog output from potentiometer 102 is converted to a digital signal. It will be recalled that there are 16 possible heat settings, each represented by a corresponding digital signal.

The internal A/D conversion routine provided in microprocessor 72 will convert the analog voltage at pin A2 to an eight bit digital code capable of establishing 256 levels. The sixteen wiper arm positions corresponding to the 16 power settings are evenly spaced along the potentiometer. By this arrangement the user selected input setting may conveniently be represented by the four high order bits of the 8 bit A/D output signal. Referring again to FIG. 7, the analog input at pin A2 is read in (Block 138) and converted to its corresponding digital signal. The four high order bits (A/DHI) of this signal are stored as the input power setting variable KB (Block 140). The program then branches (Block 142) to the Temp Input routine of FIG. 8.

TEMP INPUT Routine—FIG. 8

The function of this routine is to convert the analog voltage at pin A1 representing the sensed utensil temperature to a digital signal representative of the sensed utensil temperature. More specifically, this routine determines within which of 15 predetermined temperature ranges the present sensed utensil temperature falls. A hexadecimal value is assigned to the variable SENINP (and also SENOUT) corresponding to each of the 15 temperature ranges, as shown in Table IV. The hexadecimal value for the upper temperature threshold value for each temperature range is also included in Table IV.

TABLE IV

| Hex Rep SENINP & SENOUT | Temp. Range °F. | Hex Code Upper Threshold |
| --- | --- | --- |
| 0 | T ≦ 115 | 24 |
| 1 | 115 < T ≦ 140 | 2C |
| 2 | 140 < T ≦ 165 | 35 |
| 3 | 165 < T ≦ 190 | 44 |
| 4 | 190 < T ≦ 215 | 53 |
| 5 | 215 < T ≦ 240 | 67 |
| 6 | 240 < T ≦ 265 | 7B |
| 7 | 265 < T ≦ 290 | 90 |
| 8 | 290 < T ≦ 315 | A1 |
| 9 | 315 < T ≦ 340 | B1 |
| A | 340 < T ≦ 365 | C0 |
| B | 365 < T ≦ 390 | CA |
| C | 390 < T ≦ 415 | D3 |
| D | 415 < T ≦ 440 | DA |
| E | 440 < T ≦ 465 | E3 |
| F | 465 < T | |

Referring now to FIG. 8, R12 is set (Block 170) to turn on transistor Q1 (FIG. 6) thereby enabling energization of thermistor 104. Next the analog voltage representing the sensed temperature is read in and converted to its 8 bit digital representation (Block 172). The variable TC in the flow diagram represents the digital value of the analog signal. Inquiries 174-202 determine the temperature range in which the sensed temperature falls and Blocks 204-234 assign the appropriate value to the temperature variable SENINP in accordance with Table IV. After establishing the appropriate value for SENINP, R12 is reset (Block 236) to turn off Q1, de-energizing thermistor 104, and the program branches (Block 237) to the Sensor Filter and Timing routine (FIG. 9).

For example, if the sensed temperature is 200° F., the hexadecimal representation of the digital temperature signal will be greater than 44 corresponding to 190° F. and less than 53 corresponding to 215° F. Hence, the answer to Inquires 174-180 will be Yes. The response to Inquiry 182 will be No. The value 4 will be assigned to SENINP (Block 212). Having assigned the value to SENINP, R12 is reset (Block 236) and the program branches to the Sensor Filter and Timing routine (FIG. 9).

Figure 9:
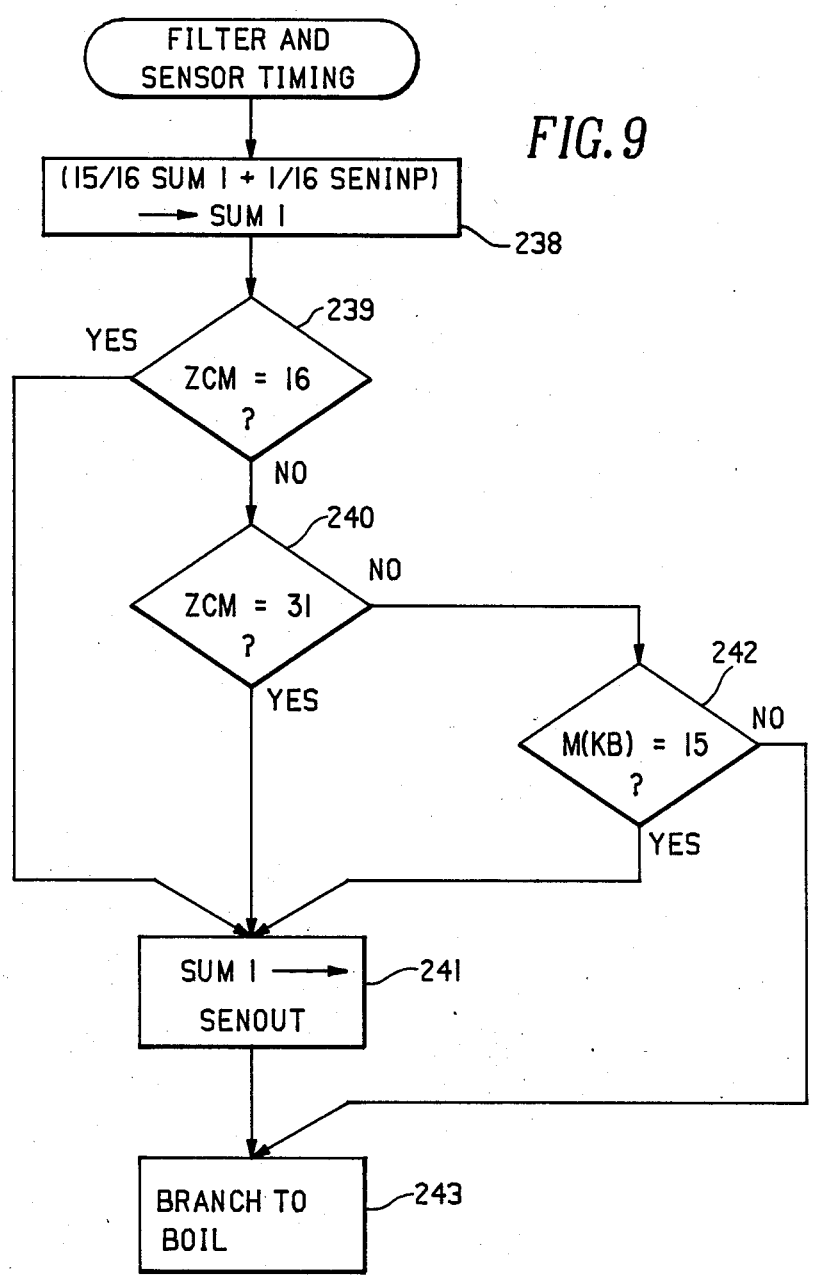
FIG. 9 is a flow diagram of the SENSOR FILTER and TIMING routine incorporated in the control program for the microprocessor in the circuit of FIG. 6.

SENSOR FILTER and TIMING Routine—FIG. 9

This routine performs the dual function of iteratively filtering the sensor output temperature signal SENINP and also controlling the timing of the updating of the temperature signal which is actually used in the control routines yet to be described. The filter function is implemented to minimize the impact of aberrant temperature measurement inputs from the temperature monitoring circuit; the timing function is implemented to minimize the effect of radiant energy from the heating element 12 impinging on thermistor 104 on the accuracy of the temperature measurements.

The iterative filter portion of this routine attaches relatively little weight to each individual input. Hence, isolated erroneous inputs are averaged out so as to have little effect on the accuracy of the cumulative average signal provided by the filter routine. Referring to FIG. 9, the filter function is performed by Block 238. It will be recalled that SENINP is the hexadecimal representation of the temperature range for the sensed utensil temperature determined in the hereinbefore described TEMP INPUT routine. One-sixteenth of the new SENINP input is added to 15/16 of the filter output variable designated SUM 1 from the previous pass through this routine. The resultant sum becomes the new value for the filter output variable SUM 1.

A new temperature input signal SENINP is processed by the filter portion of this routine to generate a new SUM 1, during each pass through the control routine, i.e. once every 133 milliseconds corresponding to 8 cycles of the 60 Hz power signal. However, to minimize the effects of radiant energy for heating element 12 on sensor 50, the sensed utensil temperature signal which is input to the power control portion of the control program is only updated during selected portions of the 4.4 second duty cycle control period.

It will be recalled that the ZCM counter operates as a 32 count ring counter, i.e. the counter counts from 0-31 and resets to 0. In the duty cycle control implemented in the POWER OUT routine to be hereinafter described, for duty cycles less than 100% the heating element is energized during the first part of the control period when the ZCM count is relatively low and de-energized while the ZCM count is relatively high. Since, except when operating at the 100% power level, the heating element is always de-energized for count 31, radiant energy effects on the sensor are minimum at ZCM count 31. Thus, radiation effects are minimized by updating SENOUT, the temperature signal utilized in implementation of the Power Control routine only at count 31. It is desirable, however, to have at least two updates of SENOUT during each 4.4 second control period, to limit oscillations between inputs. Hence, SENOUT is also updated at the midpoint of the control period, i.e. at count 16. There is potentially more error due to radiation effects for this measurement; however, the heating element is de-energized at this point for the twelve lower power levels. Hence, the effects of radiation even on this measurement are minimum except at the highest 4 power levels.

When the heating element is operated at 100% duty cycle, the radiation effects are the same at all counts; hence, for maximum accuracy SENOUT is updated during each execution of the control program, i.e. every 133 milliseconds.

Referring again to the flow diagram of FIG. 9, Inquiries 239 and 240 look for ZCM counts of 16 and 31, respectively. Upon the occurrence of either count, SENOUT is updated by the then current value of SUM 1 (Block 241). Otherwise, Inquiry 242 checks to determine if the power level presently being implemented is the 100% power level (M(KB)=15). If it is, SENOUT is updated by SUM 1 (Block 241) regardless of the count; if not, Block 241 is bypassed, and SENOUT is not updated during this pass. In this fashion for power levels lower than 15, SENOUT is updated only on counts 16 and 31, and when power level 15 is being implemented SENOUT is updated every count. Upon completion of this routine the program branches (Block 243) to the Boil routine (FIG. 10).

Figure 10:
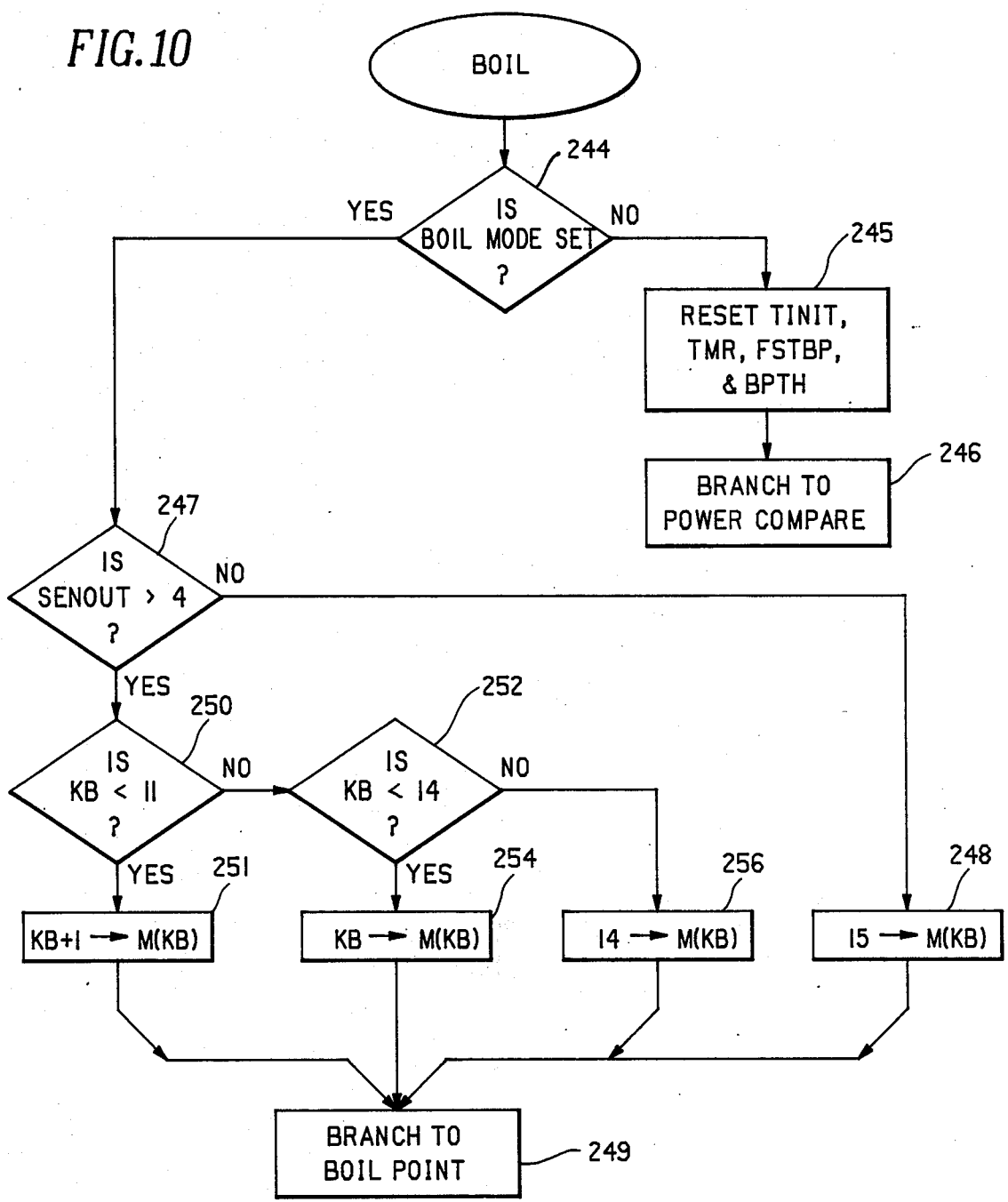
FIG. 10 is a flow diagram of the BOIL routine incorporated in the control program of the microprocessor in the circuit of FIG. 6.

BOIL Routine—FIG. 10

The function of this routine is to implement the actual Boil Modes. In the actual Boil Modes, the water loads are brought to a boil with the boil rate being determined by the heat setting selected by the user. It will be recalled that in the actual Boil Mode the heating element is energized at a predetermined high power level until the sensed utensil temperature exceeds a predetermined minimum reference temperature. In the illustrative embodiment, the threshold temperature is 215° F. and the high power level is power level 15 (100% duty cycle). When the sensed utensil temperature is greater than the minimum reference temperature, the heating element is energized at the steady state power level associated with the selected heat setting. The associated steady state power levels for settings 7–10 are 8–11, respectively. For heat settings 11–13 the associated steady state power levels are 11–13 respectively. For both heat settings 14 and 15 the associated steady state power level is 14.

Variables KB, M(KB) and SENOUT are used in this routine. The variable KB represents the heat setting selected by the user by manipulation of control knob 22 (FIG. 2). Its value is assigned in the User Input routine. M(KB) is a variable which represents the power level at which the heating element is to be operated. When operating in the Boil Mode, its value is established in the Boil routine and it is utilized in the Power Compare routine to make the triac triggering decisions. SENOUT is the temperature variable representing the sensed utensil temperature. Its value is assigned in the Filter and Sensor Timing routine.

Figure 11A:
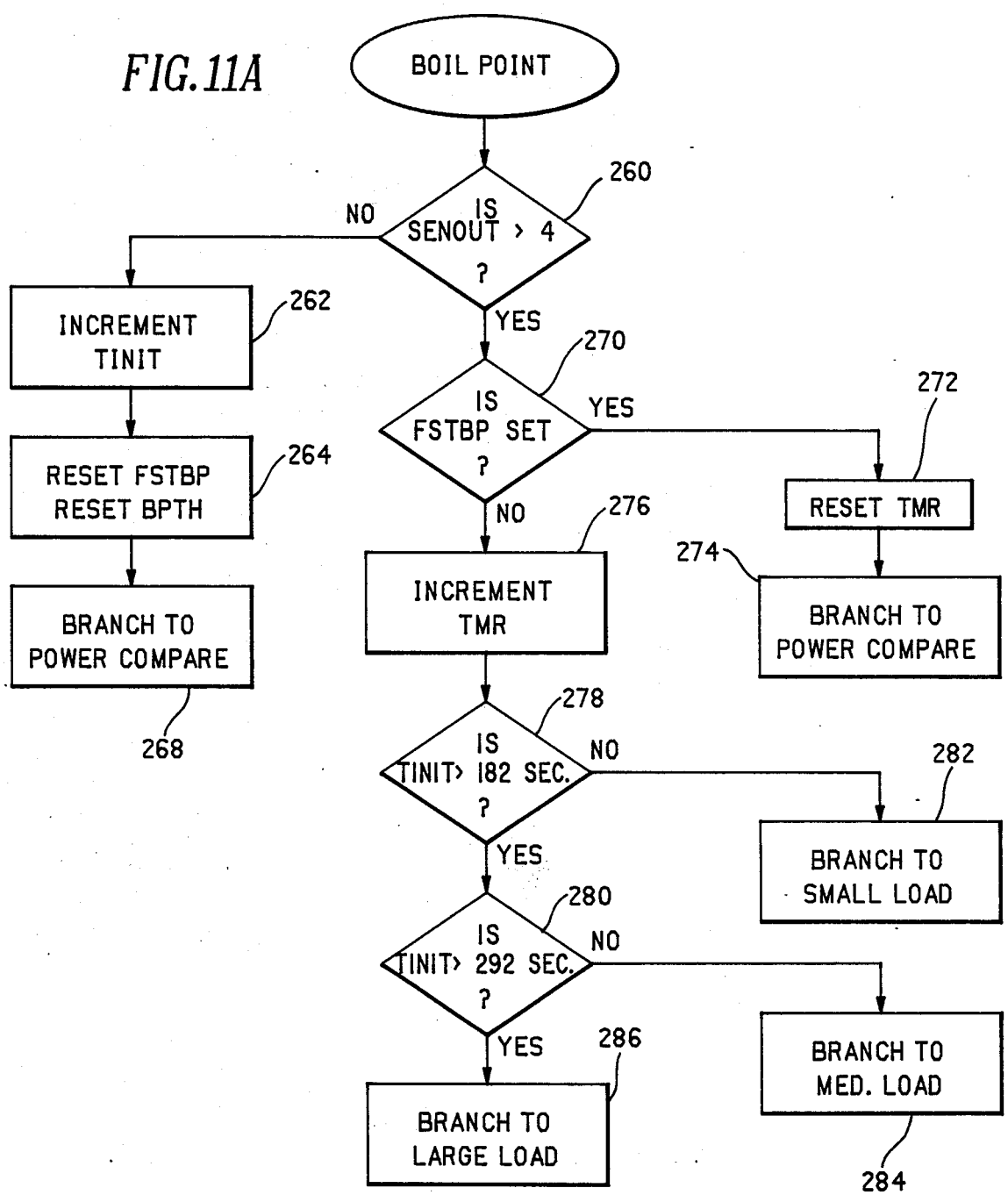
FIGS. 11A, 11B, 11C and 11D are flow diagrams of the BOIL POINT routine incorporated in the control program for the microprocessor in the circuit of FIG. 6.

Referring now to the flow diagram of FIG. 10, Inquiry 244 determines if the Boil Mode Flag is set signifying selection of the Boil Mode. If not, the TINIT and TMR timers and FSTBP and BPTH latches are reset (Block 245) and the program branches (Block 246) to the Power Compare routine (FIG. 12). If the Boil Mode Flag is set, Inquiry 247 determines if the sensed utensil temperature exceeds the minimum boil reference temperature of 215° F. (SENOUT>4). If not, power level 15 is set by setting M(KB) to 15 (Block 248) and the program branches (Block 249) to the Boil Point routine (FIG. 11A). If the sensed utensil temperature is greater than 215°, Inquiry 250 detects the selection of any one of heat settings 7–10 (KB<11). For heat settings 7–10, the appropriate one of steady power levels 8–11, respectively, is set by setting M(KB) to KB+1 (Block 251). The program then branches (Block 249) to the Boil Point Routine (FIG. 11A). Inquiry 252 detects the selection of any one of heat settings 11–13. For these heat settings the appropriate one of power levels 11–13 respectively is set by setting M(KB) to KB (Block 254).

For heat settings 14–15, (KB not less than 14) M(KB) is set to 14 (Block 256) to set the steady state power level at 14 for each of these heat settings. The program then branches (Block 249) to the Boil Point routine (FIG. 11A).

BOIL POINT Routine—FIGS. 11A–11D

This routine is entered from the Boil routine when the appliance is operating in the Boil mode. Its function is to determine when water being heated has reached its boiling point. To this end, this routine measures the heat-up time required for the sensed temperature to exceed the threshold temperature of 215° F. to obtain an estimate of thermal load size and determine when the completion time for the sensed load size and selected power setting has expired. Expiration of the completion time signifies the boiling point has been reached.

Two timers are utilized in this routine; one, designated TINIT, for measuring the heat-up time, that is the time required for the load to first exceed the threshold temperature of 215° F., and one, designated TMR, which is used to determine when the completion time has expired.

TINIT is incremented on each pass through the Boil Point routine when the sensed utensil temperature is less than or equal to 215° F. It is reset when not operating in the Boil Mode. TMR is incremented on each pass through the routine when the temperature is greater than 215° F. provided the completion time has not expired.

The addition of water during the heat-up phase is accommodated in the present embodiment by incrementing TINIT whenever the sensed utensil temperature is not greater than 215° F. and resetting it only when operation in the Boil Mode is terminated by the user, and incrementing TMR whenever the sensed utensil temperature exceeds 215° F. and resetting only when the operative completion time expires. When water is added prior to the sensed utensil temperature exceeding 215° F., TINIT will ultimately be incremented to a higher value reflecting the now larger thermal load. If the water is added after the sensed utensil temperature exceeds 215° F. and the volume of water added is sufficient to cause the sensed utensil temperature to drop below 215° F., the TINIT timer will begin incrementing from its previous final value and the value of TMR will remain at its then present value. This value of TINIT will be used to establish an updated completion time.

Two latches, one designated BPTH and one designated FSTBP, are also used in this routine. BPTH is set when the boil point is detected and is used in the Boil Signal routine to enable an annunciator for a predetermined duration. FSTBP is set when the boil point is first reached and is used to prevent the boil point annunciator from being continuously triggered during the boiling operation.

Figure 12A:
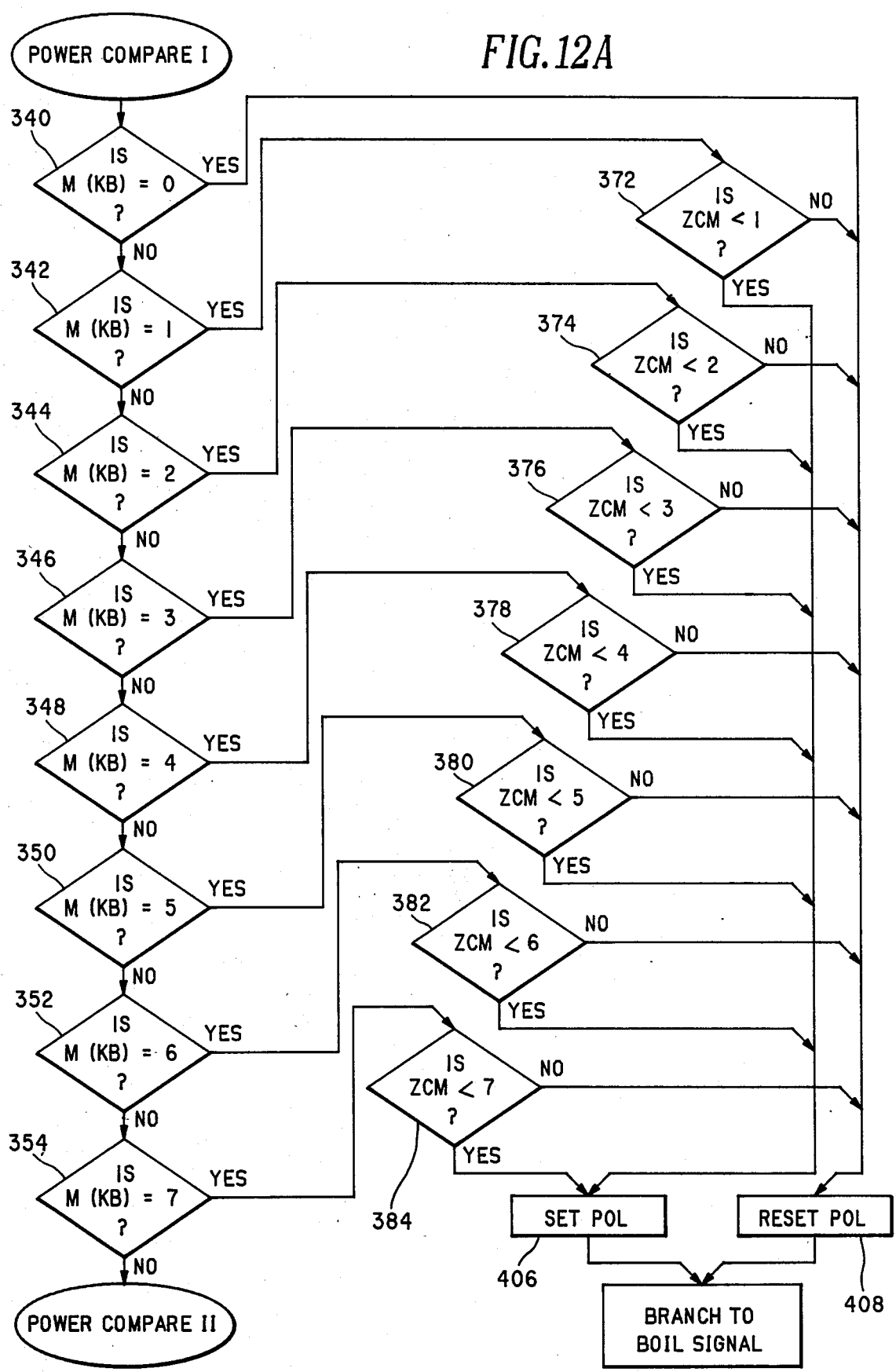
FIGS. 12A and 12B are flow diagrams of the POWER COMPARE routine incorporated in the control program for the microprocessor in the circuit of FIG. 6.

Referring now to FIG. 11A, Inquiry 260 determines whether the threshold temperature of 215° F. has been exceeded. If not, TINIT is incremented (Block 262), FSTBP and BPTH are reset (Block 264), and the program branches (Block 268) to the Power Compare routine (FIG. 12A).

Figure 11B:
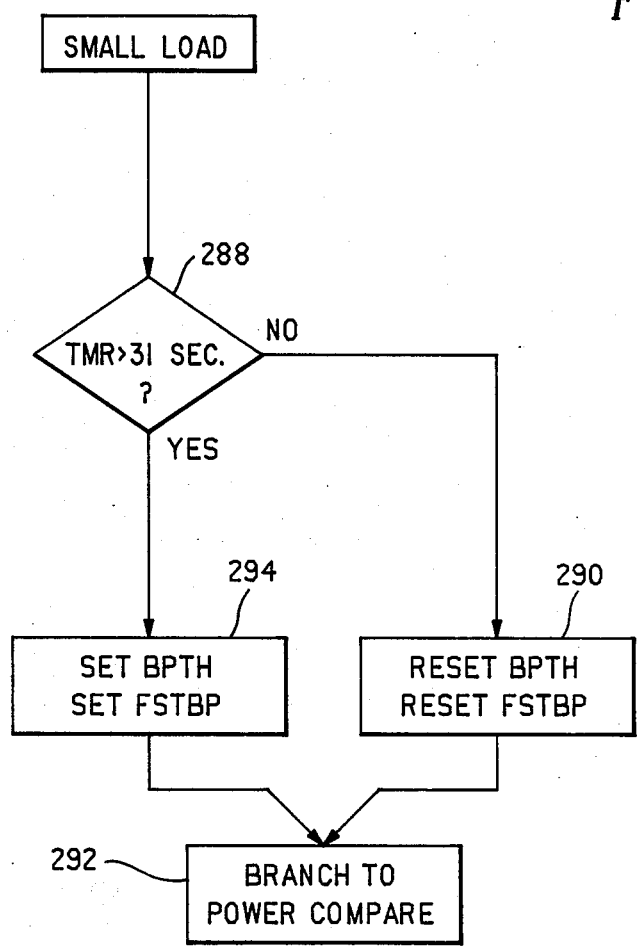

Referring back to Inquiry 260, if the threshold temperature has been exceeded, Inquiry 270 determines whether the occurrence of boiling has yet been detected by checking the state of FSTBP. If set signifying that boiling has been detected during a previous pass through the program, the completion time TMR is reset (Block 272) and the program branches (Block 274) to the Power Compare routine of FIG. 12. If the FSTBP latch is not set signifying boiling has not yet been initially detected, TMR is incremented (Block 276). Inquiries 278 and 280 determine load size by comparing the heat-up time required to reach 215° F. against 182 seconds and 292 seconds respectively. If the heat-up time is not greater than 182 seconds, a small load is signified and the program branches (Block 282) to the Small Load sub-routine (FIG. 11B). If the heat-up time is greater than 182 seconds but not greater than 292 seconds, a medium load is signified and the program branches (Block 284) to the Medium Load sub-routine of FIG. 11C. Finally, if the heat-up time indicated by the count of timer TINIT exceeds 292 seconds, a large load is signified and the program branches to the Large Load sub-routine (Block 286) of FIG. 11D.

Referring to FIG. 11B, Inquiry 288 determines whether the reference completion time of 31 seconds established for small loads has expired. If not, BPTH and FSTBP are reset (Block 290) and the program branches (Block 292) to the Power Compare routine (FIG. 12). If 31 seconds has expired signifying that the completion time has expired, BPTH and FSTBP are set (Block 294) and the program branches to the Power Compare routine of FIG. 12.

Figure 11C:
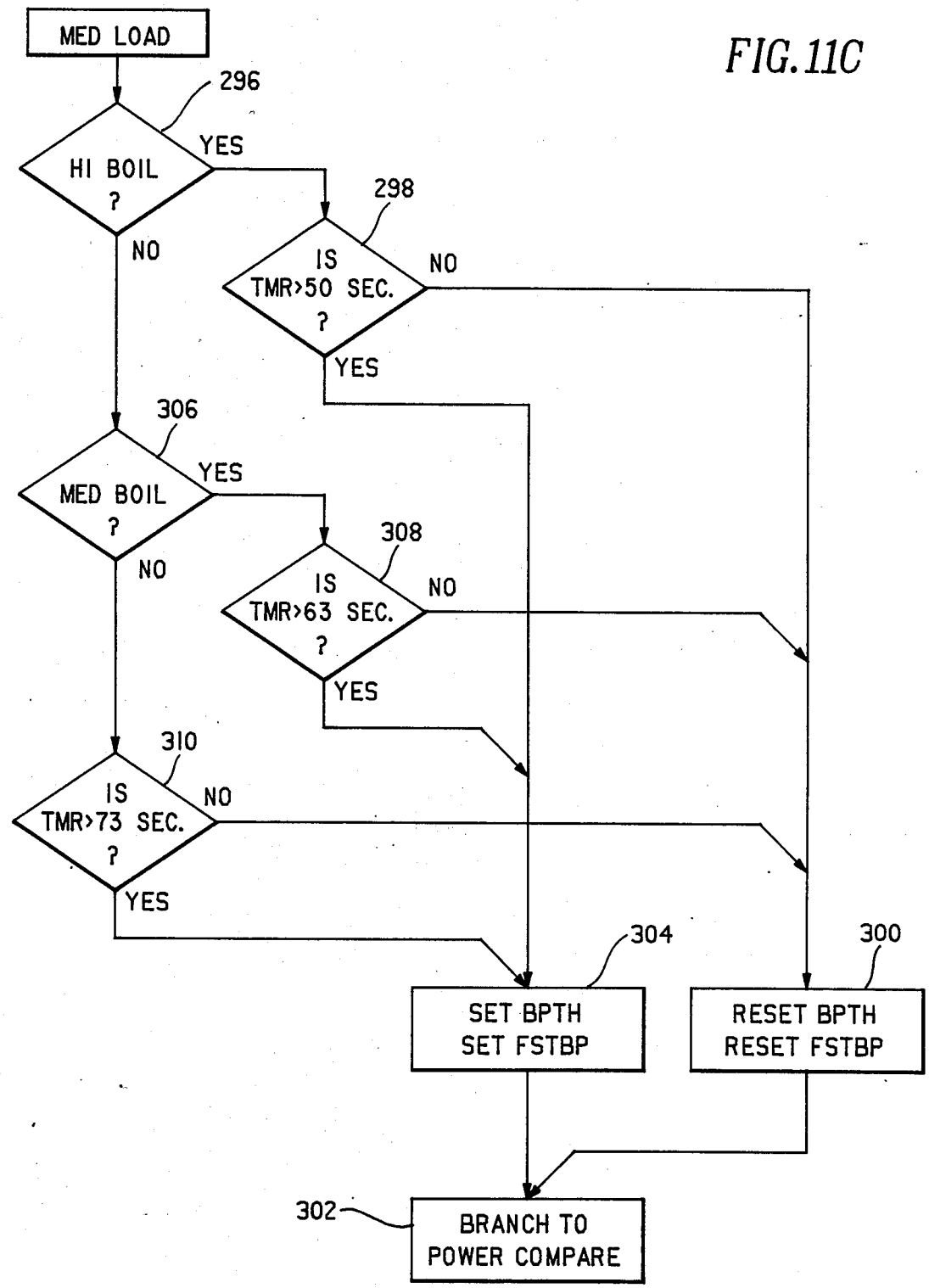

Referring now to FIG. 11C, the Medium Load subroutine, Inquiry 296 determines if the Hi Boil power setting has been selected. If it has, Inquiry 298 determines if TMR signifies a completion time greater than 50 seconds. If not, the boiling point has not yet been reached and BPTH and FSTBP are reset (Block 300) and the program branches (Block 302) to the Power Compare routine of FIG. 12. If TMR is greater than 50 seconds signifying that the completion time has expired, BPTH is set, FSTBP is set (Block 304) and the program branches to the Power Compare routine. If Hi Boil has not been selected, Inquiry 306 determines if the Medium Boil setting has been selected. If so, Inquiry 308 determines if the associated completion time of 63 seconds has expired. If not, BPTH and FSTBP are reset (Block 300) and the program branches (Block 302) to the Power Compare routine of FIG. 12. If TMR is greater than 63 seconds, signifying the completion time has expired, BPTH and FSTBP are set (Block 304) and the program branches to the Power Compare routine (Block 302). If the Medium Boil setting has not been selected, the only other choice is the Low Boil setting. Hence, the program at Inquiry 310 determines if the threshold time for the Low Boil setting of 73 seconds has expired. If not, BPTH and FSTBP are reset (Block 300) and the program branches to Power Compare routine. If the completion time of 73 seconds has expired, BPTH and FSTBP are set (Block 304) and the program branches (Block 302) to the Power Compare routine.

Figure 11D:
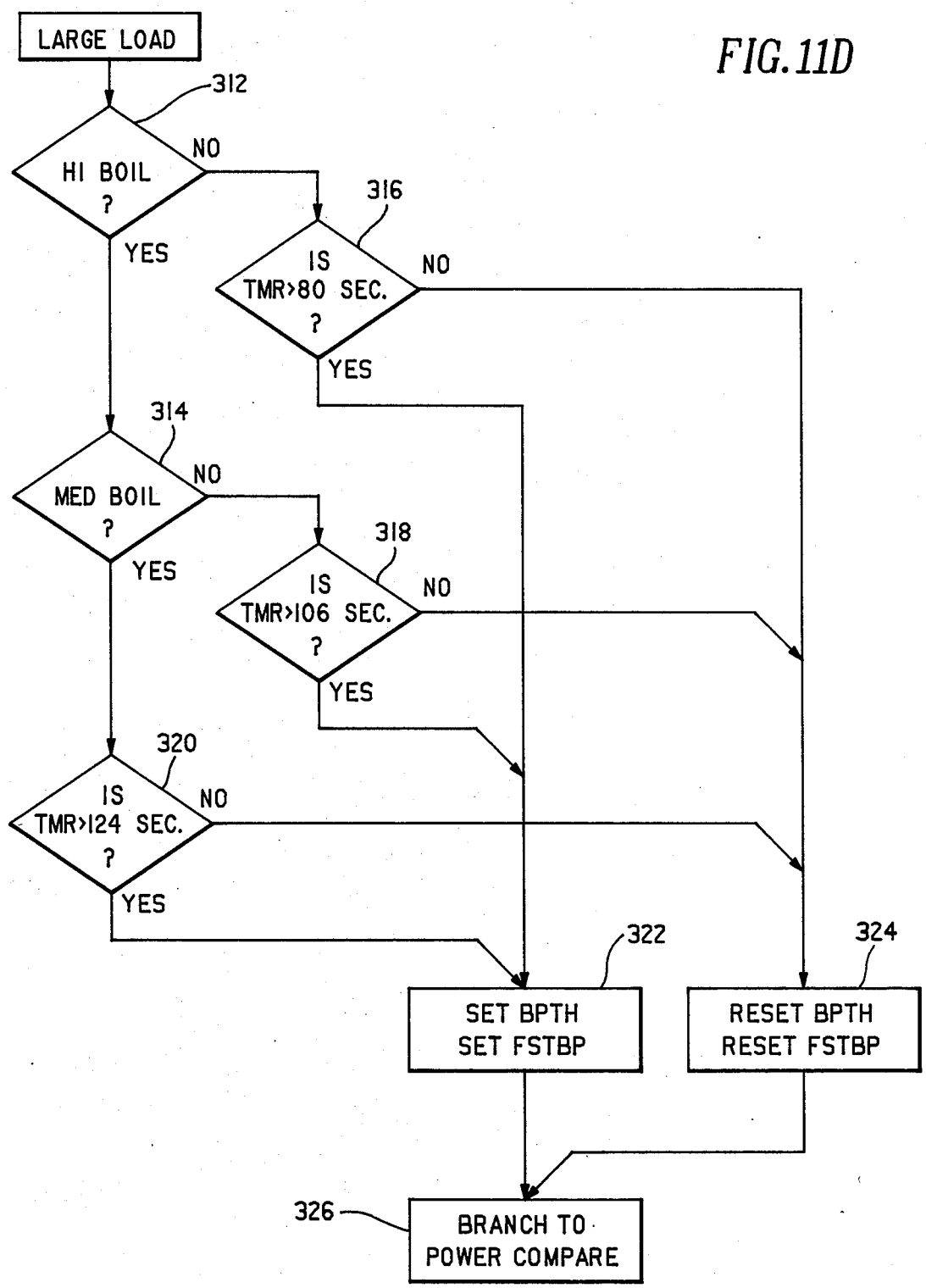

Finally, referring to the Large Load sub-routine in FIG. 11D, Inquiries 312 and 314 respectively determine whether the High or Medium Boil mode has been selected and Inquiries 316, 318, and 320 determine if the associated completion times for the high, medium and low boil modes respectively have expired. If the appropriate inquiry determines that the associated completion time has expired, BPTH and FSTBP are set (Block 322). Otherwise, these latches are reset (Block 324). In either event, the program then branches to the Power Compare routine of FIG. 12.

Figure 12B:
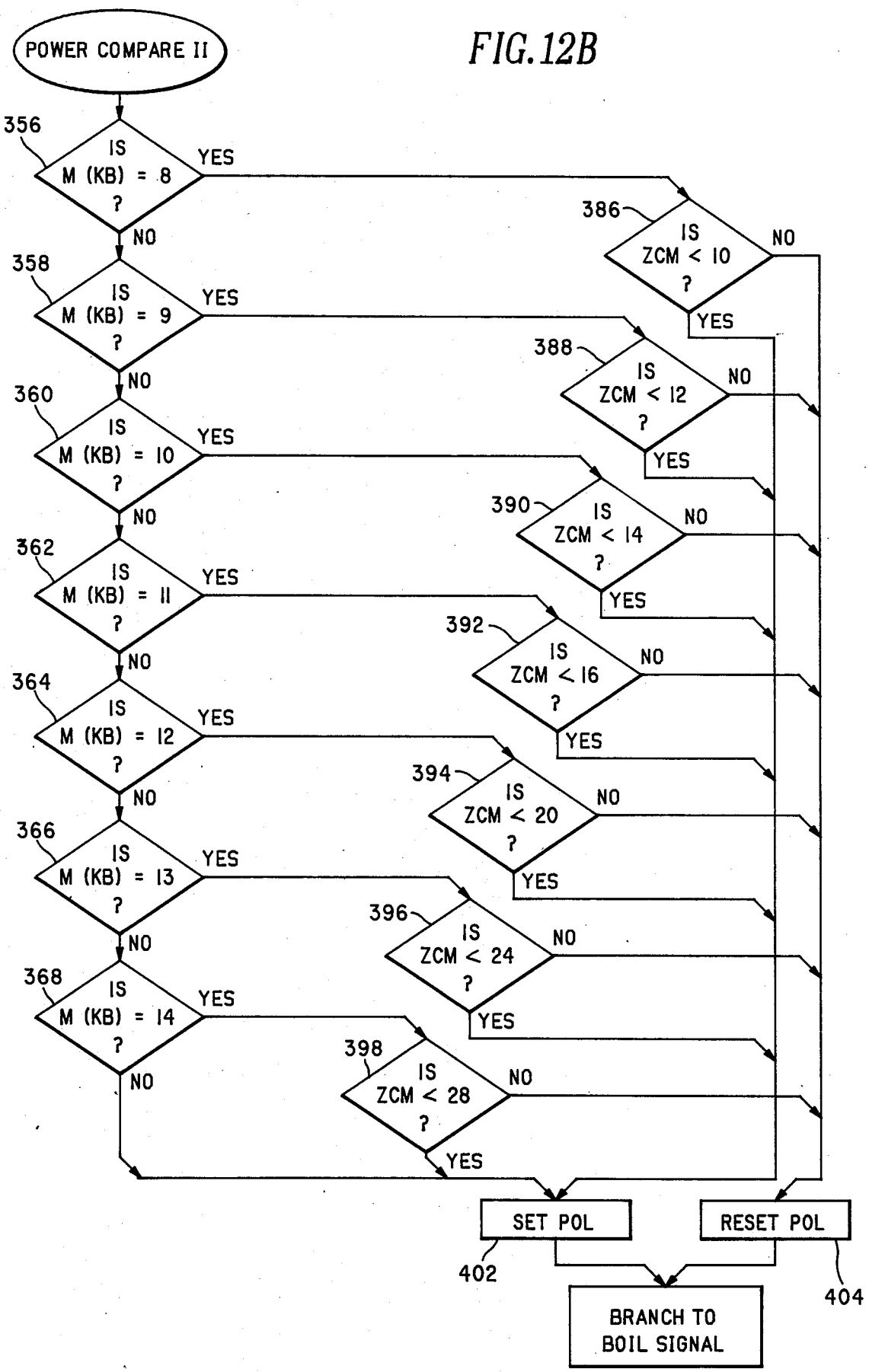

POWER COMPARE Routine—FIGS. 12A and 12B

The function of the Power Compare routine is to determine, based upon the power level designated by M(KB), whether or not the power control triac should be triggered into conduction for the next eight cycle control interval.

It will be recalled that there are 16 possible power levels including OFF. The % duty cycle for each power level corresponds to the ratio of conductive control intervals to 32, the number of control intervals in the control period. The ZCM counter as hereinbefore described functions as a 32 count ring counter, which is incremented once for each pass through the control program. The power control decision is made by comparing the ZCM count with a reference count associated with the signified power level M(KB). The reference count for each power level represents the number of conductive control intervals per control period corresponding to the desired duty cycle. When the ZCM count is less than the reference, a Power Out Latch (POL) is set, signifying that switching power control triac 106 is to be switched into conduction; otherwise, POL is reset, signifying that power control triac 106 non-conductive.

Referring to FIGS. 12A and B, Inquiries 340-368 determine the value of M(KB). The appropriate one of Inquiries 372-398 corresponding to the identified M(KB) performs the comparison of ZCM to the associated reference count. If ZCM is less than the reference, the Power Out Latch is set by the appropriate one of Blocks 402 and 406, signifying that the heating element 12 is to be energized during the next control interval. Otherwise, the Power Out Latch is reset by the appropriate one of Blocks 404 and 408, signifying that heating element 12 is to be de-energized during the next control interval.

Figure 13:
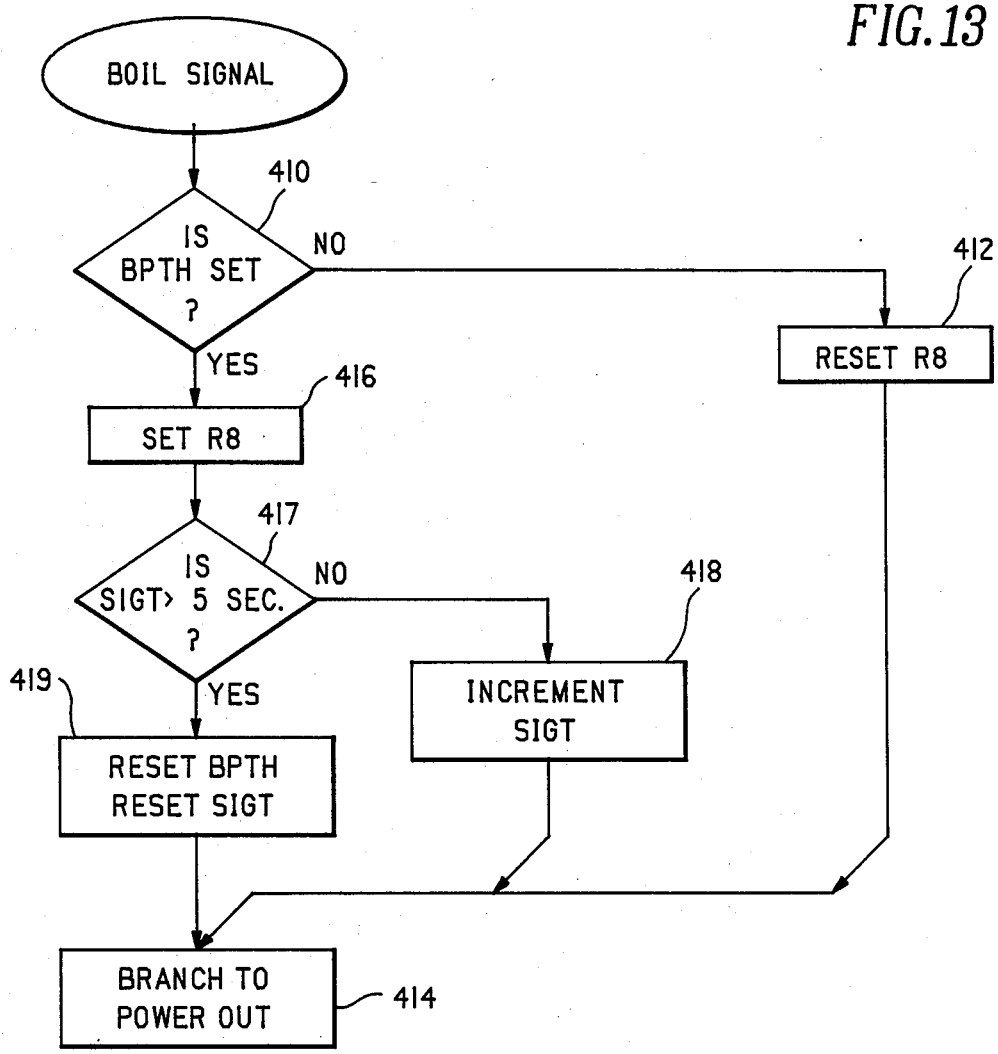
FIG. 13 is a flow diagram of the BOIL SIGNAL routine incorporated in the control program for the microprocessor in the circuit of FIG. 6.

Having made the power control decision, the program branches to the Boil Signal Routine, FIG. 13.

BOIL SIGNAL Routine—FIG. 13

The function of this routine is to control the triggering of an indicator means in the form of an annunciator to provide a user discernible signal to alert the user that boiling should have begun. In the illustrative embodiment this signal is provided by annunciator 101 (FIG. 6) which is triggered on for a period of 5 seconds when an initiation of boiling is detected.

Inquiry 410 determines the state of BPTH latch. If BPTH is reset signifying that either boiling has not yet occurred or that the signal has already been given, output port R8 which controls annunciator 101 is reset (Block 412) and the program branches to the Power Out routine (Block 414) of FIG. 14. If the BPTH latch is set signifying that boiling has been detected, output port R8 is set (Block 416) which enables annunciator 101 and Inquiry 417 checks the state of the signal timer designated SIGT to determine if the 5 second interval has elapsed. If not, SIGT is incremented (Block 418) and the program branches (Block 414) to the Power Out routine of FIG. 14. If the 5 second time interval has expired, BPTH and SIGT are reset (Block 419) and the program branches (Block 414) to the Power Out routine of FIG. 14.

Figure 14:
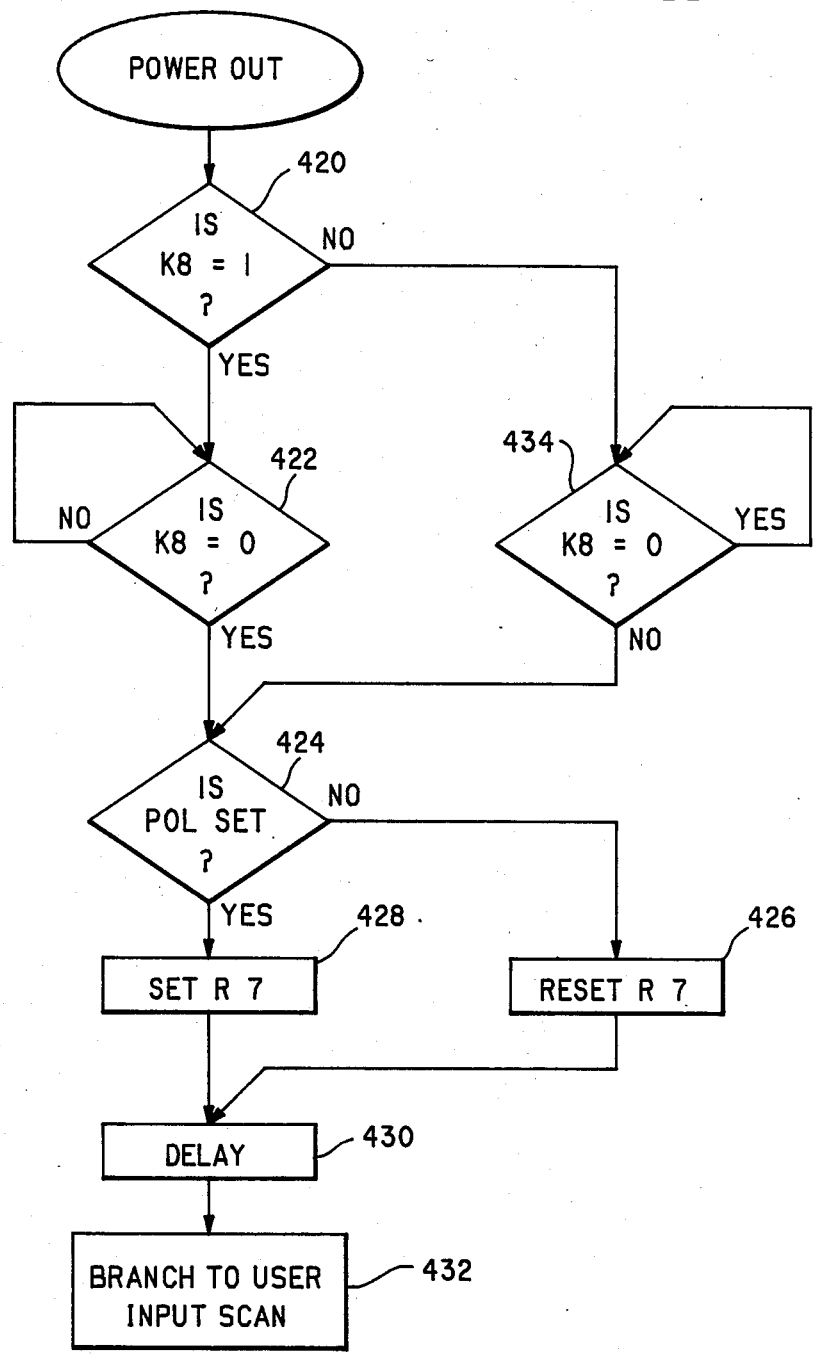
FIG. 14 is a flow diagram of the POWER OUT routine incorporated in the control program of the microprocessor in the circuit of FIG. 6.

POWER OUT Routine—FIG. 14

The function of this routine is to await the next zero crossing of the 60 Hz AC power signal applied to the heating element 12 to synchronize firing of power control triac 82 (FIG. 6) with zero-crossings of the power signal.

Input port K8 receives zero crossing pulses from zero crossing detector circuit 100 (FIG. 6). Positive half-cycles are represented by K8=1 and negative half-cycles by K8=0. Inquiry 420 determines the polarity of the present power signal half-cycle. If the signal is presently in a positive half-cycle, (K8=1), Inquiry 422 waits for the beginning of the next negative half-cycle, (K8=0). Upon detection of K8=1, the program proceeds to Inquiry 424. If the answer to Inquiry 420 is NO (K8=0), Inquiry 434 waits for the beginning of the next positive half-cycle (K8=1), then proceeds to Inquiry 424. Inquiry 424 checks the state of the Power Out Latch (POL). If POL is reset, signifying that heating element 12 is not to be energized during the next control interval, R7 is reset (Block 426); if POL is set, signifying heating element 12 is to be energized, R7 is set (Block 428); the program delays (Block 430) and then returns (Block 432) to the User Input Routine (FIG. 7) to repeat the control program for the next control interval.

In the illustrative embodiment the control program is executed before the end of the 8 cycle control interval. Thus, it is necessary to delay the program until the beginning of the next control interval before repeating the User Input Routine. Except for the delay, the hereinbefore described program is executed in less than one half cycle of the power signal. Thus, the program delays for 15 transitions of the input signal at K4. However, it is to be understood that microprocessor could be programmed to perform additional functions such as, for example, controlling the energization of the other three surface units during the time period between executions of the control program for heating unit 12. The other surface units could be similarly equipped with a temperature sensor and controlled by a control program similar to that for element 12. Alternatively, the elements could be controlled in open loop fashion.

It is apparent from the foregoing that the present invention provides a novel arrangement for automatically predicting in advance the occurrence of boiling rather than merely detecting its occurrence. Though in the illustrative embodiment this information is used to generate a signal alerting the user that boiling has begun, it will be appreciated that such predictive information could be also advantageously employed in power control algorithms to enhance energy efficiency or to prevent boil-over.

While in accordance with the Patent Statutes, a specific embodiment of the present invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A cooking appliance comprising:
   at least one heater means for heating a cooking utensil;
   temperature sensing means for sensing the temperature of a utensil being heated by said heater means;
   user operable input selector means enabling a user to select a Boil mode; and
   electronic control means response to said temperature sensing means and said input selector means for controlling said heater means; said control means being operative in said Boil mode to at least initially operate said heater means at a predetermined power level;
   said control means including timing means operative in the Boil mode to measure the heat-up time and means for establishing a completion time as a function of said heat-up time, said heat-up time being the cumulative amount of time during the period between initiation of the Boil mode and expiration of the completion time, that the sensed utensil temperature is less than a predetermined minimum boil reference temperature, and said completion time representing the approximate additional time required for the contents of the utensil to reach its boil point, whereby the measured heat-up time and corresponding completion time automatically adjust to the addition of water any time prior to expiration of said completion time.

2. A cooking appliance in accordance with claim 1 further comprising indicator means responsive to said control means operative upon expiration of said completion time to generate a user discernible signal indicating that the contents of the utensil have been heated to approximately its boiling point.

3. A cooking appliance comprising:
   heater means for heating a cooking utensil;
   temperature sensing means for sensing the temperature of a utensil being heated by said heater means;
   user operable input selector means enabling a user to select a Boil mode and one of a plurality of different heat settings for said Boil mode, each heat setting having associated with it a predetermined steady state power level;
   electronic control means responsive to said temperature sensing means and said input selector means for controlling said heater means; said control means being operative in said Boil mode to operate said heater means at a predetermined power level when the sensed utensil temperature is less than a predetermined minimum boil reference temperature and to operate said heater means at the power level associated with the selected heat setting when the sensed utensil temperature exceeds said reference temperature;
   said control means including timing means operative to measure the heat-up time required for the sensed temperature to reach said predetermined minimum boil reference temperature in response to selection of the Boil mode, means for establishing a completion time as a function of both said heat-up time and the selected heat setting, said completion time representing the approximate additional time required for the contents of the utensil to reach its boil point.

4. A cooking appliance in accordance with claim 3 further comprising indicator means responsive to said control means operative upon expiration of said completion time to generate a user discernible signal indicating that the contents of the utensil have been heated to approximately its boiling point.

5. A method for predicting when a liquid in a utensil being heated by a cooking appliance will reach its boiling point, the appliance being of the type having heating means for heating the utensil, temperature sensing means for sensing the temperature of the utensil, and user actuable input selector means enabling the user to select a Boil mode and one of a plurality of heat settings in the Boil mode, and control means for controlling the heating level of the heating means in response to user input selections, said method comprising:
   operating the heating means at a predetermined power level until a predetermined threshold temperature is reached;
   at least periodically sensing the temperature of the utensil to detect when the utensil temperature exceeds the predetermined threshold temperature;
   measuring the heat-up time required for the utensil temperature to reach the threshold temperature; and
   establishing a completion time representing the approximate additional time required for the utensil to reach its boiling point as a function of the heat-up time and the user selected heat setting.

6. The method of claim 5 further comprising the step of generating a user discernible signal upon expiration of the completion time signifying to the user that the liquid has reached its boiling point.

* * * * *